United States Patent
Miyatani et al.

(10) Patent No.: US 6,804,217 B1
(45) Date of Patent: Oct. 12, 2004

(54) CDMA MOBILE STATION APPARATUS

(75) Inventors: Tetsuhiko Miyatani, Sendai (JP); Koji Yotsumoto, Chitose (JP); Shunji Abe, Sendai (JP)

(73) Assignee: Kokusai Electric Co., Ltd., Tokyo (JP)

( * ) Notice: Subject to any disclaimer, the term of this patent is extended or adjusted under 35 U.S.C. 154(b) by 739 days.

(21) Appl. No.: 09/663,359

(22) Filed: Sep. 15, 2000

(30) Foreign Application Priority Data

Sep. 17, 1999 (JP) .............................. 11-263527
Apr. 21, 2000 (JP) ........................ 2000-121295

(51) Int. Cl.⁷ .............................................. H04B 7/216
(52) U.S. Cl. ..................... 370/335; 370/342; 375/147
(58) Field of Search ............................... 370/335, 342, 370/350; 375/147, 149, 150

(56) References Cited

U.S. PATENT DOCUMENTS

| | | | | |
|---|---|---|---|---|
| 4,470,138 A | * | 9/1984 | Gutleber | 370/342 |
| 5,363,403 A | * | 11/1994 | Schilling et al. | 370/441 |
| 5,812,543 A | * | 9/1998 | Sugita | 370/342 |
| 5,887,034 A | * | 3/1999 | Suzuki | 375/285 |
| 5,898,665 A | * | 4/1999 | Sawahashi et al. | 370/342 |
| 5,978,413 A | * | 11/1999 | Bender | 375/149 |
| 6,034,989 A | * | 3/2000 | Kochi et al. | 375/150 |
| 6,137,786 A | * | 10/2000 | Ariyoshi et al. | 370/335 |
| 6,385,187 B1 | * | 5/2002 | Ahn et al. | 370/342 |
| 6,570,909 B1 | * | 5/2003 | Kansakoski et al. | 375/148 |
| 6,636,496 B1 | * | 10/2003 | Cho et al. | 370/335 |

FOREIGN PATENT DOCUMENTS

DE       2233614       3/1974

* cited by examiner

*Primary Examiner*—Chau Nguyen
*Assistant Examiner*—Christine Ng
(74) *Attorney, Agent, or Firm*—Wenderoth, Lind & Ponack, L.L.P.

(57) ABSTRACT

A CDMA mobile station apparatus receives a spread control signal including a non-orthogonal spread signal generated using a non-orthogonal spreading code which is non-orthogonal with a data signal spreading code and a spread data signal produced by spreading a data signal with a data signal spreading code from a base station apparatus via a radio link. The mobile station apparatus has a non-orthogonal spread signal generating unit for generating a non-orthogonal spread signal whose phase rotation caused by a radio transmission path is compensated for using a non-orthogonal spreading code, a subtracting unit for subtracting the generated non-orthogonal spread signal from the received signal to generate a difference signal, and a data signal demodulating unit for demodulating the difference signal into a data signal. The mobile station apparatus is capable of canceling an entire spread broadcasting signal, processing a band-limited signal, or processing a spreading code with a suppression coefficient.

13 Claims, 20 Drawing Sheets

(a) —— LIMITED IN BAND
(b) —■— NOT LIMITED IN BAND

—●— $R_{off}$=0.5, Root Nyq (a) —— STATIC CHARACTERISTIC THEORETICAL VALUE
(b) —■— BEFORE CANCELING
(c) —▲— CANCELER w/SUPPRESSION COEFFICIENT 0.5
(d) —×— CANCELER w/SUPPRESSION COEFFICIENT 0.25
(e) —✳— CANCELER w/SUPPRESSION COEFFICIENT 1.0

Prior Art

CDMA MOBILE STATION APPARATUS

BACKGROUND OF THE INVENTION

1. Field of the Invention

The present invention relates to a CDMA mobile station apparatus for receiving a control spread signal and a spread data signal via a radio link, and more particularly, to a CDMA mobile station apparatus for canceling a control spread signal partly or wholly as an interference signal from a received signal so as to increase the accuracy with which to demodulate a data signal.

2. Description of the Related Art

CDMA (Code Division Multiple Access) systems are known as point-to-point connection systems based on spectrum spread communication principles. In a CDMA radio communication system, a signal that is spread by a spreading code is transmitted via a radio link between a base station apparatus, i.e., a CDMA base station apparatus, and a mobile station apparatus, i.e., a CDMA mobile station apparatus. In such a system, a plurality of signals can be spread by different respective spreading codes and the spread signals can be transmitted by way of multiplex communications.

Generally, the base station apparatus of the above described system, which performs cellular communications based on W-CDMA principles, transmits individual spread data signals to respective mobile station apparatus and a control spread signal to all of the mobile station apparatus that are parallel to each other via radio links. The mobile station apparatus respectively demodulate the individual spread data signals from the signals which have been received via the radio links.

The individual spread data signals that are transmitted to the respective mobile station apparatus comprise, for example, spread signals that are transmitted via dedicated physical data channels (DPDCH) for respective users, and the control spread signal that is transmitted to all of the mobile station apparatus comprises, for example, a spread signal that is transmitted via a broadcasting channel (BCCH) (hereinafter referred to as "spread broadcasting signal") for all of the users or a spread signal transmitted via a common pilot channel (CPICH) (hereinafter referred to as "spread common pilot signal")for all of the users, for example.

Conventional systems and their problems will be described below with respect to spread data signals for DPDCH as individual spread data signals and spread broadcasting signals for BCCH as control spread signals.

The spread data signal is produced by spreading a data signal with a spreading signal for data signals. The spread data signal has a variable information transmission rate (and spreading ratio) so as to be compatible with services of different information rates although the bandwidth (chip rate) of the spread data signal is constant. Since the required communication quality varies depending on the magnitude of the information transmission rate, the transmission power of the spread data signal is made variable so as to be able to meet variations in the communication quality.

The spread broadcasting signal is produced by spreading a broadcasting signal with a spreading signal for broadcasting signals. The spread broadcasting signal has a constant information transmission rate and a constant transmission power.

The spread data signal is used to transmit data individually from the base station apparatus to the mobile station apparatus, and the spread broadcasting signal is used to transmit common information from the base station apparatus to all of the mobile station apparatus. The spread broadcasting signal is also used for the mobile station apparatus to establish synchronism with the base station apparatus.

Specifically, when the mobile station apparatus are switched on, the mobile station apparatus use the spread broadcasting signal in an initial connection sequence, for connection to the base station apparatus. However, the mobile station apparatus do not use the spread broadcasting signal for individual data communications with the base station apparatus.

FIG. 19 of the accompanying drawings shows an example of the frame format of a perch channel (BCCH) used to transmit a spread broadcasting signal via a radio link. As shown in FIG. 19, one frame of the BCCH includes 16 slots #0–#15. Each of the slots #0–#15 includes an LC section 141 having 9 symbols #0–#8, for example, that are spread with a long code (LC) having a period of 10 msec. and a short code (SC) having a period of 62.5 $\mu$sec., and a long code mask symbol 142 comprising one symbol, e.g., a symbol #9 at the final end of the slot spread by a short code.

The long code mask symbol 142 is composed of the sum of a short code (common short code) 143 that is shared by the system and a short code (inherent short code) 144 that differs from base station apparatus to base station apparatus or from sector to sector. The base station apparatus has a plurality of sectors.

The long code refers to a spreading code having a relatively long period, and the short code refers to a spreading code having a relatively short period. One symbol comprises 256 chips, for example.

An arrangement and operation of a receiver of a mobile station apparatus in the above system will be described below.

FIG. 20 of the accompanying drawings shows an example of the receiver of the mobile station apparatus. In the receiver, as shown in FIG. 20, an antenna 151 receives a signal that is transmitted from a base station apparatus via a radio link, and a reception unit (RX) 152 downconverts the received signal in a carrier frequency band into a baseband signal. A spreading code generator 153 is capable of generating a plurality of spreading codes for respective signals or channels that are desired to be received. The receiver selects one of the spreading codes that is generated by the spreading code generator 153 so as to select a signal or channel to be received.

Specifically, a spreading code that is generated by the spreading code generator 153 is outputted to a complex correlator 154. The complex correlator 154 acquires correlated values between the received signal outputted from the reception unit 152 and the spreading code outputted from the spreading code generator 153. The correlated values outputted from the complex correlator 154 are then demodulated by a demodulator 155, thereby decoding information of the signal or channel corresponding to the spreading code.

Thus, by applying the spreading code for the broadcasting signal to the complex correlator 154, the broadcasting signal is decoded. For example, when a spreading code for a data signal is applied to the complex correlator 154, the data signal is decoded, and the information of each code-divided signal or channel is decoded.

FIG. 21 of the accompanying drawings shows another example of the receiver of the mobile station apparatus. As shown in FIG. 21, the receiver has a BCCH demodulator 163 for demodulating a broadcasting signal or a control signal and a data demodulator 164 for demodulating a data signal, where the BCCH demodulator 163 and the data demodulator 164 comprise separate processors from one another.

Specifically, an antenna 161 receives a signal from a base station apparatus via a radio link, and the received signal is processed by a reception unit 162. A spread broadcasting signal that is included in the received signal is demodulated into a broadcasting signal by the BCCH demodulator 163, and a spread data signal that is included in the received signal is demodulated into a data signal by the data demodulator 164.

However, when the above CDMA mobile station apparatus demodulates a data signal from a signal that is received from the base station apparatus via a radio link, since a spread broadcasting signal that is included in the received signal acts as an interference signal for a spread data signal included in the received signal, the accuracy with which to demodulate the spread data signal into a data signal tends to be lowered. In particular, the LC section 141 shown in FIG. 19 is generated by using a long code that is in a code orthogonal relationship to the data signal spreading code, whereas the long code mask symbol 142 is generated by using a short code that is not in a code orthogonal relationship, i.e., non-orthogonal, to the data signal spreading code. Therefore, the interference cause by the long code mask symbol 142 is greater.

A specific example of the above-identified interference will be described below with reference to FIGS. 22($a$) through 22($c$) of the accompanying drawings.

FIG. 22($a$) shows an example of a string of correlated peaks of a data signal that is produced by a mobile station apparatus when no spread broadcasting signal is present (an ideal case). FIG. 22($b$) shows an example of correlated values between a spread broadcasting signal and a data signal spreading code, i.e., levels of interference with a data signal. As schematically shown in FIG. 22($c$), since an actual mobile station apparatus obtains the sum of the string of correlated peaks shown in FIG. 22($a$) and the levels of interference shown in FIG. 22($b$), the broadcasting signal acts as an interference signal with respect to the data signal.

If, for example, a data signal spreading code in a system having a bandwidth of 4.096 MHz is composed of 128 chips, i.e., the data signal spreading code has an information transmission rate of 32 kHz, then the correlator integrates a received signal for the time of the 128 chips in obtaining correlated values between the received signal and a data signal spreading code. In this case, the interference level of a spread broadcasting signal included in the received signal is reduced to a level of $1/128$, which is relatively small as compared with the interference level before the received signal is despread, because of the integration for the time of the 128 chips (the integration corresponds to a low-pass filter (LPF)).

According to the CDMA scheme, the receiver is arranged so as to be able to increase the information transmission rate. Since the bandwidth is constant, if the information transmission rate becomes higher, then the integration time in the correlator becomes shorter. For example, if a data signal spreading code is composed of 16 chips, i.e., the data signal spreading code has an information transmission rate of 256 kHz, then the correlator integrates a received signal for the time of the 16 chips in obtaining correlated values between the received signal and a data signal spreading code. In this case, the interference level of a spread broadcasting signal included in the received signal is only reduced to a level of $1/16$ as compared with the interference level before the received signal is despread.

In general, a spread broadcasting signal needs to be transmitted from a base station apparatus to all of the mobile station apparatus that are present in the communication range of the base station apparatus, i.e., a cell area that is covered by the base station apparatus. Therefore, it is customary for the base station apparatus to transmit the spread broadcasting signal on a radio wave at a power level that is large enough to enable the radio wave to reach the end of the communication range. If the interference level is reduced to only $1/16$, then the interference of the spread broadcasting signal with the spread data signal is so large that it cannot be ignored, where such large interference results in the accuracy with which the data signal is demodulated, i.e., the reception quality of the data signal, being greatly deteriorated. The accuracy deterioration is caused due to the fact that whereas the level of the correlated peaks shown in FIG. 22($a$) increases depending on the length of the data signal spreading code, i.e., the number of chips, the interference level shown in FIG. 22($b$) is substantially the same regardless of the length of the data signal spreading code.

Generally, the above-described radio communication system is used in a multipath environment where a signal that is transmitted from a transmission apparatus, e.g., a base station apparatus, passes through a plurality of paths to a reception apparatus, e.g., a mobile station apparatus. Due to interference between multipath signals, the LC section 141 shown in FIG. 19 acts as a large interference signal with respect to a spread data signal. In the multipath environment, an entire spread broadcasting signal which generally has a larger transmission power than a spread data signal tends to act as an interference signal with respect to the spread data signal.

While conventional systems and their problems have been described above with respect to spread broadcasting signals, for example, similar problems occur with respect to spread control signals.

Specifically, the spread common pilot signal referred to above is produced by spreading a common pilot signal with a spreading code therefor, and the spread common pilot signal is a signal that is sent at a fixed rate to nonspecific users. The spreading code for the common pilot signal is in a code having an orthogonal relationship to a data signal spreading code. In the multipath environment, the entire spread common pilot signal tends to interfere with the spread data signal. The common pilot signal comprises a predetermined string of symbols, for example, and is used as interpolating information, e.g., phase information or the like, for each mobile station apparatus so as to perform coherent detection with respect to the base station apparatus.

SUMMARY OF THE INVENTION

It is therefore an object of the present invention to provide a CDMA mobile station apparatus which is capable of increasing the accuracy with which to demodulate a data signal when receiving a spread control signal and a spread data signal from a base station apparatus via a radio link.

To achieve the above-described object, there is provided, in accordance with the present invention, a CDMA mobile station apparatus for receiving a spread control signal including a non-orthogonal spread signal that is generated by using a non-orthogonal spreading code that is non-orthogonal with a data signal spreading code and a spread data signal that is produced by spreading a data signal with a data signal spreading code from a base station apparatus via a radio link. The CDMA apparatus according to the present invention comprises non-orthogonal spread signal generating means for generating a non-orthogonal spread signal by using a non-orthogonal spreading code, subtracting means for subtracting the generated non-orthogonal spread signal from a received signal so as to generate a difference signal, and data signal demodulating means for demodulating the difference signal into a data signal by using the data signal spreading code.

Since the non-orthogonal spread signal that is generated by using the non-orthogonal spreading code, which is non-orthogonal with the data signal spreading code, is canceled as an interference signal from the received signal, the accuracy with which to demodulate the received signal into the data signal is increased. Specifically, a larger interference is produced between two signals that are generated by using spreading codes that are non-orthogonal with each other than two signals that are generated by using spreading codes that are in code orthogonal relationship to each other. According to the present invention, at least interference between two signals that are generated by using spreading codes that are non-orthogonal with each other is canceled so as to increase the quality of the data signal that is received.

Furthermore, in view of the fact that the non-orthogonal spread signal that is included in the received signal is generally subjected to a phase rotation which is caused by a radio transmission path, the non-orthogonal spread signal generating means generates a non-orthogonal spread signal to which a phase rotation corresponding to the phase rotation has been imparted.

Therefore, the non-orthogonal spread signal that is subjected to the phase rotation that is caused by the radio transmission path is compensated for so as to cancel the non-orthogonal spread signal from the received signal. As a result, the accuracy with which the received signal is demodulated into the data signal is increased.

If the non-orthogonal spread signal that is included in the received signal is limited in band, then the non-orthogonal spread signal generating means generates a non-orthogonal spread signal which has been limited in band.

Therefore, the band limitation that is applied to the non-orthogonal spread signal by a transmission apparatus, i.e., the base station apparatus, or a reception apparatus, i.e., the CDMA mobile station apparatus, is compensated for so as to cancel the non-orthogonal spread signal from the received signal. As a result, the accuracy with which the received signal is demodulated into the data signal is increased.

Moreover, if the non-orthogonal spread signal that is generated by the non-orthogonal spread signal generating means has an error with respect to the non-orthogonal spread signal that is included in the received signal, then the non-orthogonal spread signal generating means generates a non-orthogonal spread signal whose signal intensity has been suppressed.

Consequently, even if the generated non-orthogonal spread signal suffers an error due to an estimated transmission path error, the signal intensity of the non-orthogonal spread signal is suppressed and canceled from the, received signal. As a result, the accuracy with which the received signal is demodulated into the data signal is increased.

According to the present invention, there is also provided a CDMA mobile station apparatus for receiving a spread control signal that is produced by spreading a control signal with a control signal spreading code and a spread data signal that is produced by spreading a data signal with a data signal spreading code from a base station apparatus via a radio link.

This CDMA mobile station apparatus according to the present invention comprises: spread control signal generating means for demodulating a received signal into a control signal by using a control signal spreading code, and for spreading the demodulated control signal with a control signal spreading code so as to generate a spread control signal; subtracting means for subtracting the generated spread control signal from the received signal so as to generate a difference signal; and data demodulating means for demodulating the difference signal into a data signal by using a data signal spreading code.

Since the spread control signal that acts as an interference signal with respect to the spread data signal is canceled in its entirety from the received signal, the accuracy with which to demodulate the received signal into the data signal is increased. It is particularly effective to cancel the entire spread control signal if the CDMA mobile station apparatus is used in a multipath environment.

In view of the fact that the spread control signal that is included in the received signal is generally subjected to a phase rotation that is caused by a radio transmission path, the spread control signal generating means generates a spread control signal to which a phase rotation corresponding to the phase rotation that is caused by the radio transmission path has been imparted.

If the spread control signal that is included in the received signal is limited in band, then the spread control signal generating means generates a spread control signal which has been limited in band.

Moreover, if the spread control signal that is generated by the spread control signal generating means has an error with respect to the spread control signal that is included in the received signal, then the spread control signal generating means generates a spread control signal whose signal intensity has been suppressed.

The data signal or spread data signal referred to herein comprises a data communication signal including character data, image data, audio data, etc. that is to be transmitted between the base station apparatus and the CDMA mobile station apparatus.

The control signal or spread control signal referred to herein comprises a control signal which represents control information for establishing synchronism between a base station apparatus and the CDMA mobile station apparatus, and includes control data for achieving a desired control process, for example.

The data signal or spread data signal may be a DPDCH signal, and the control signal or spread control signal may be a broadcasting signal or a spread broadcasting signal or a common pilot signal or a spread common pilot signal. Alternatively, the data signal or spread data signal or the control signal or spread control signal may be another signal. Inasmuch as the CDMA mobile station apparatus of the present invention increases the accuracy with which the received signal is demodulated into the data signal by canceling, partly or wholly, a signal other than the data signal or spread data signal and tends to interfere with the data signal or spread data signal, from the received signal, the principles of the present invention are also applicable to such an interference signal by regarding the interference signal as the data signal, the spread data signal, the control signal, or the spread control signal.

The above and other objects, features, and advantages of the present invention will become apparent from the following description when taken in conjunction with the accompanying drawings which illustrate preferred embodiments of the present invention by way of examples.

DETAILED DESCRIPTION OF THE INVENTION

Embodiments of the present invention will be described below with reference to the drawings in connection with a spread signal for DPDCH (dedicated physical data channels) (hereinafter referred to as "spread data signal"), which is a conventional individual spread data signal as described above, and a spread broadcasting signal for BCCH (broadcasting channel), which is a conventional spread control signal as described above.

First Embodiment

First, a CDMA mobile station apparatus according to a first embodiment of the present invention will be described below. Since the present invention is directed to an arrangement of a reception section of a CDMA mobile station apparatus, such an arrangement will primarily be described below.

Figure 1:
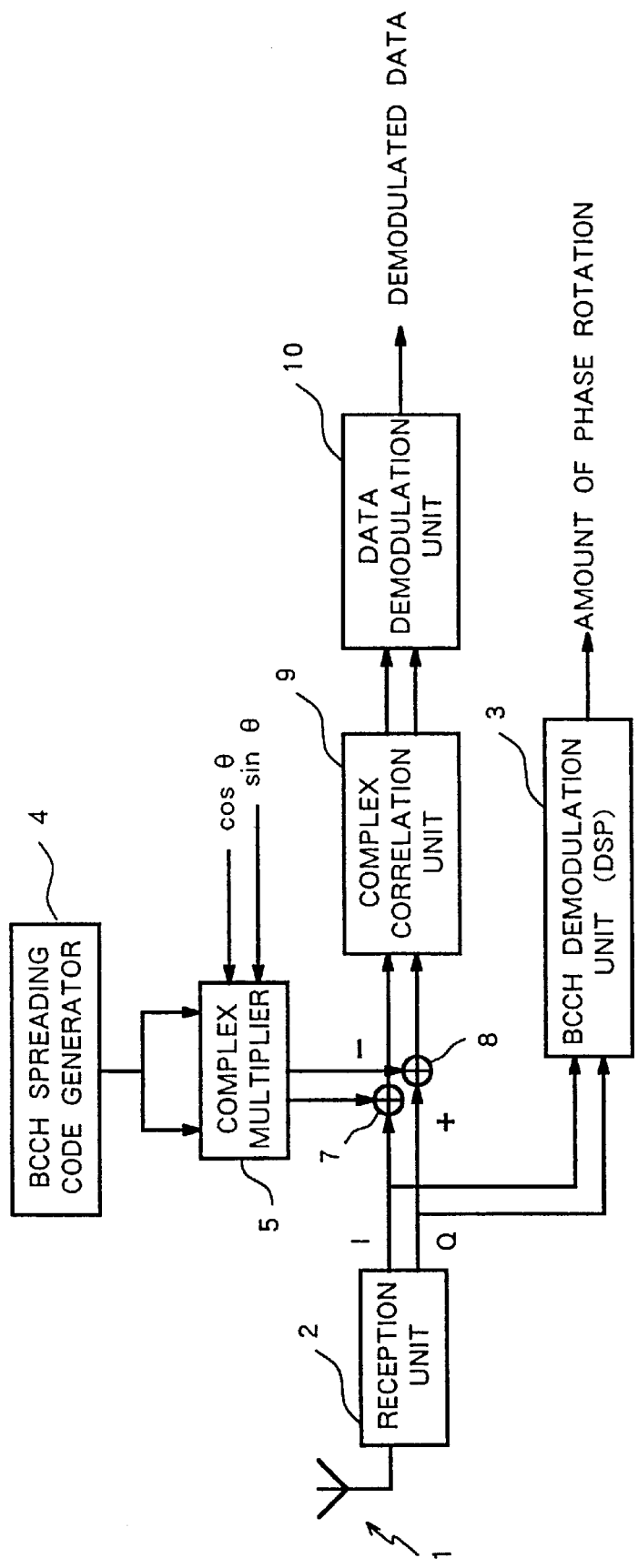
FIG. 1 is a block diagram of a CDMA mobile station apparatus according to a first embodiment of the present invention.

FIG. 1 shows a receiver in the CDMA mobile station apparatus according to the first embodiment of the present invention. As shown in FIG. 1, the receiver has an antenna 1, a reception unit 2 comprising a receiver unit, a BCCH demodulation unit 3 comprising a correlator and a demodulator, a BCCH spreading code generator 4 comprising a register, a complex multiplier 5, two subtractors 7, 8, a complex correlation unit 9 comprising a correlator, and a data demodulation unit 10 comprising a demodulator.

The antenna 1 receives a signal that is transmitted from a base station apparatus, i.e., a CDMA base station apparatus, via a radio link, and the antenna 1 outputs the received signal to the reception unit 2. In the first embodiment, the antenna 1 receives a spread broadcasting signal and a spread data signal, which are similar to those described above with respect to the conventional system, in a superposed relationship to each other from the base station apparatus via a radio link.

The reception unit 2 extracts a signal in a predetermined reception frequency band from the signal that is outputted from the antenna 1, downconverts the extracted signal in a carrier frequency band into a baseband signal, and outputs the baseband signal to the BCCH demodulation unit 3 and the subtractors 7, 8. In the first embodiment, signals are subject to quadrature modulation for communications, and the reception unit 2 outputs the received signal as I-phase (in phase) and Q-phase (quadrature phase) signals.

The BCCH demodulation unit 3 despreads the received signal that is outputted from the reception unit 2 with a broadcasting signal spreading code to thereby demodulate the received signal into a broadcasting signal.

Figure 2:
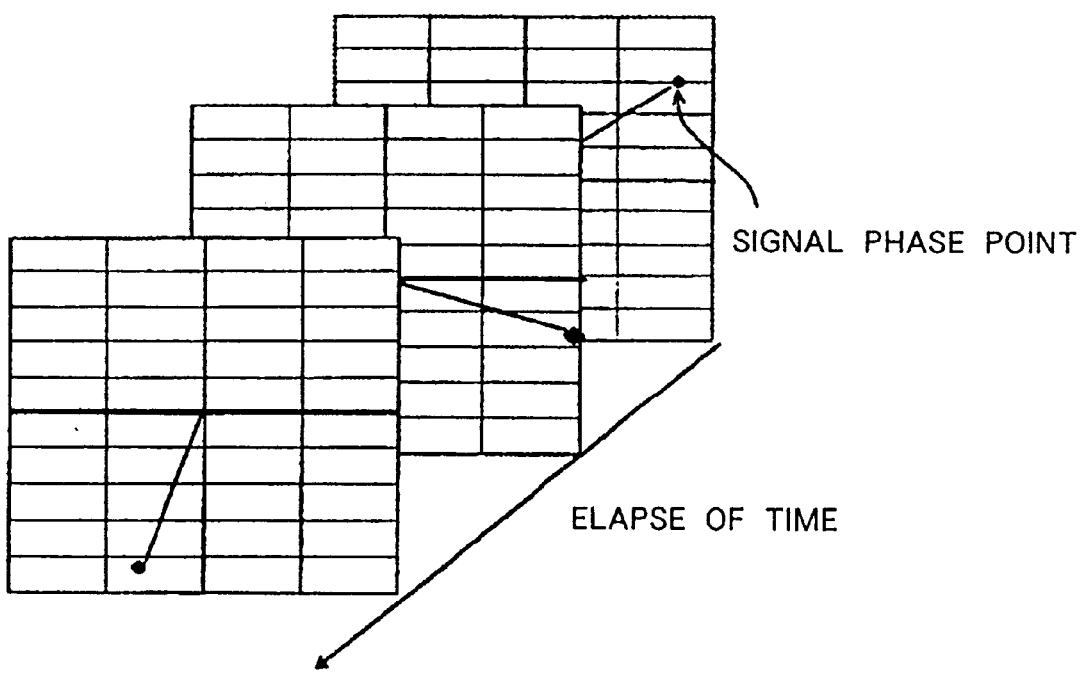
FIG. 2 is a diagram showing an example of phase rotation due to transmission path variations.

Generally, a signal that is propagated through a radio transmission path undergoes phase rotation due to transmission path variations while the signal is propagated through space. Therefore, the received signal is subjected to phase rotation in the radio transmission path. FIG. 2 shows, by way of an example, such phase rotation with a phase point of the signal rotating with time as the signal is propagated through space.

In a coherent detection process that is carried out in demodulating the received signal into the broadcasting signal, the BCCH demodulation unit 3 detects a phase variation in the radio transmission path of the received spread broadcasting signal. Based on the detected phase variation, the BCCH demodulation unit 3 outputs information representing the amount of phase rotation in the radio transmission path of the received spread broadcasting signal. The BCCH demodulation unit 3 detects a phase variation in the same manner as with general demodulation units. The BCCH demodulation unit 3 comprises a DSP (Digital Signal Processor), for example.

Figure 19:
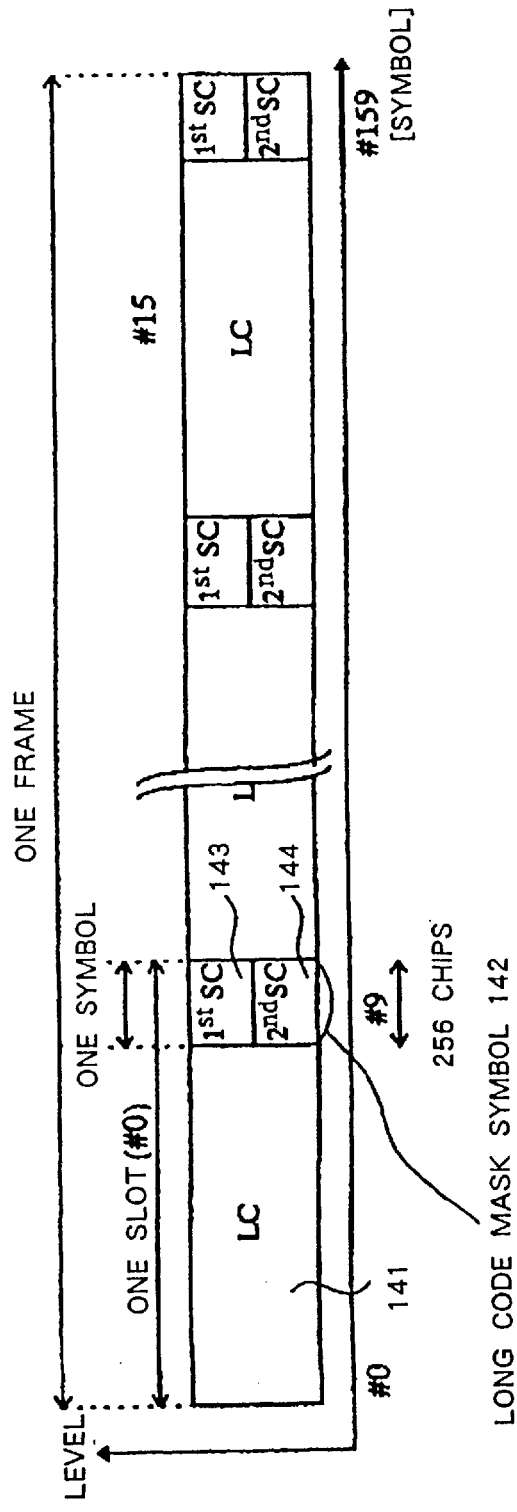
FIG. 19 is a diagram showing an example of the frame format of a perch channel.
Figure 20:
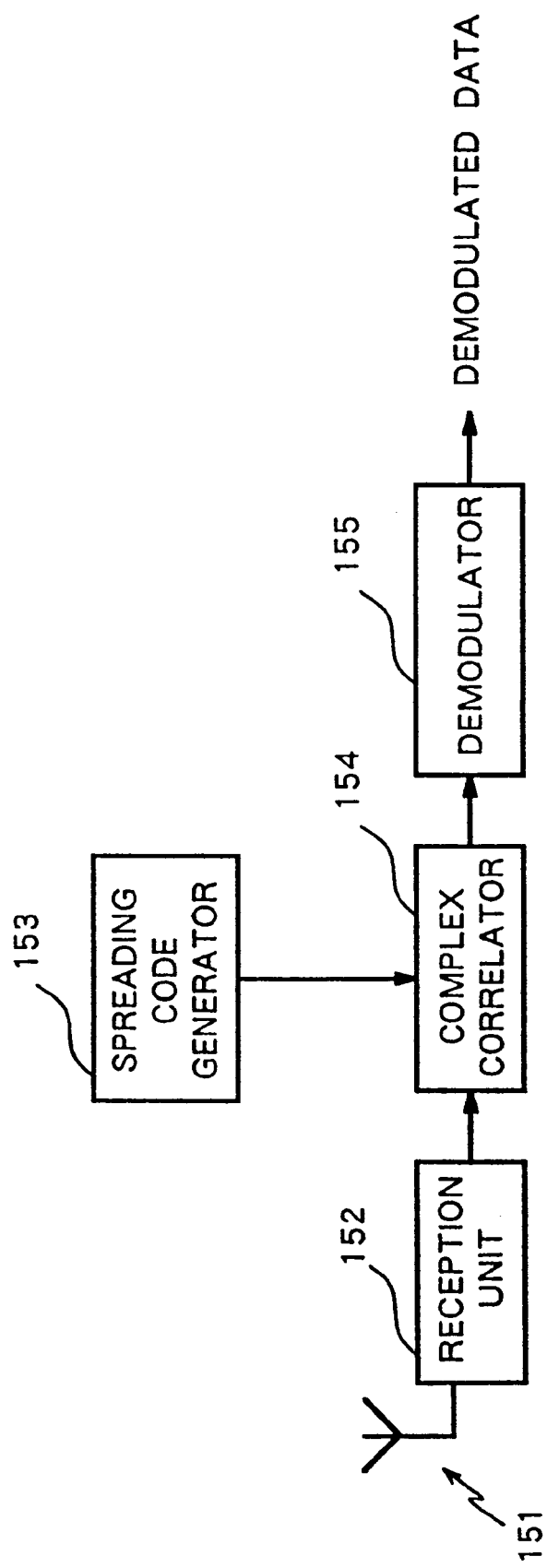
FIG. 20 is a block diagram of a conventional CDMA mobile station apparatus.
Figure 21:
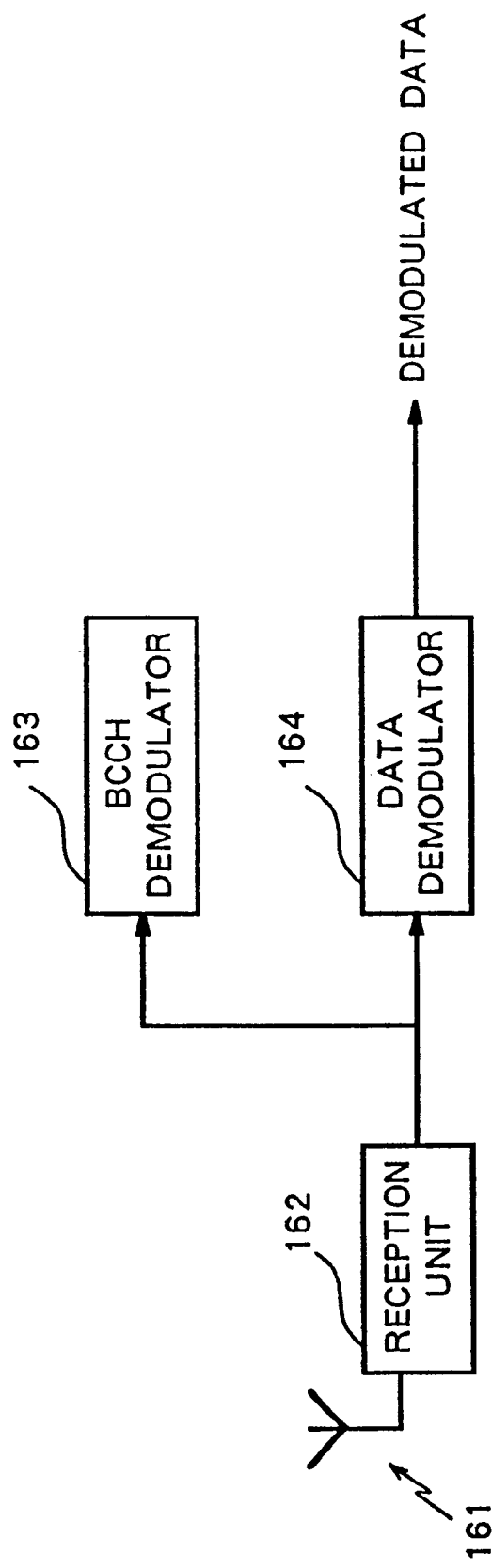
FIG. 21 is a block diagram of another conventional CDMA mobile station apparatus.
Figure 22:
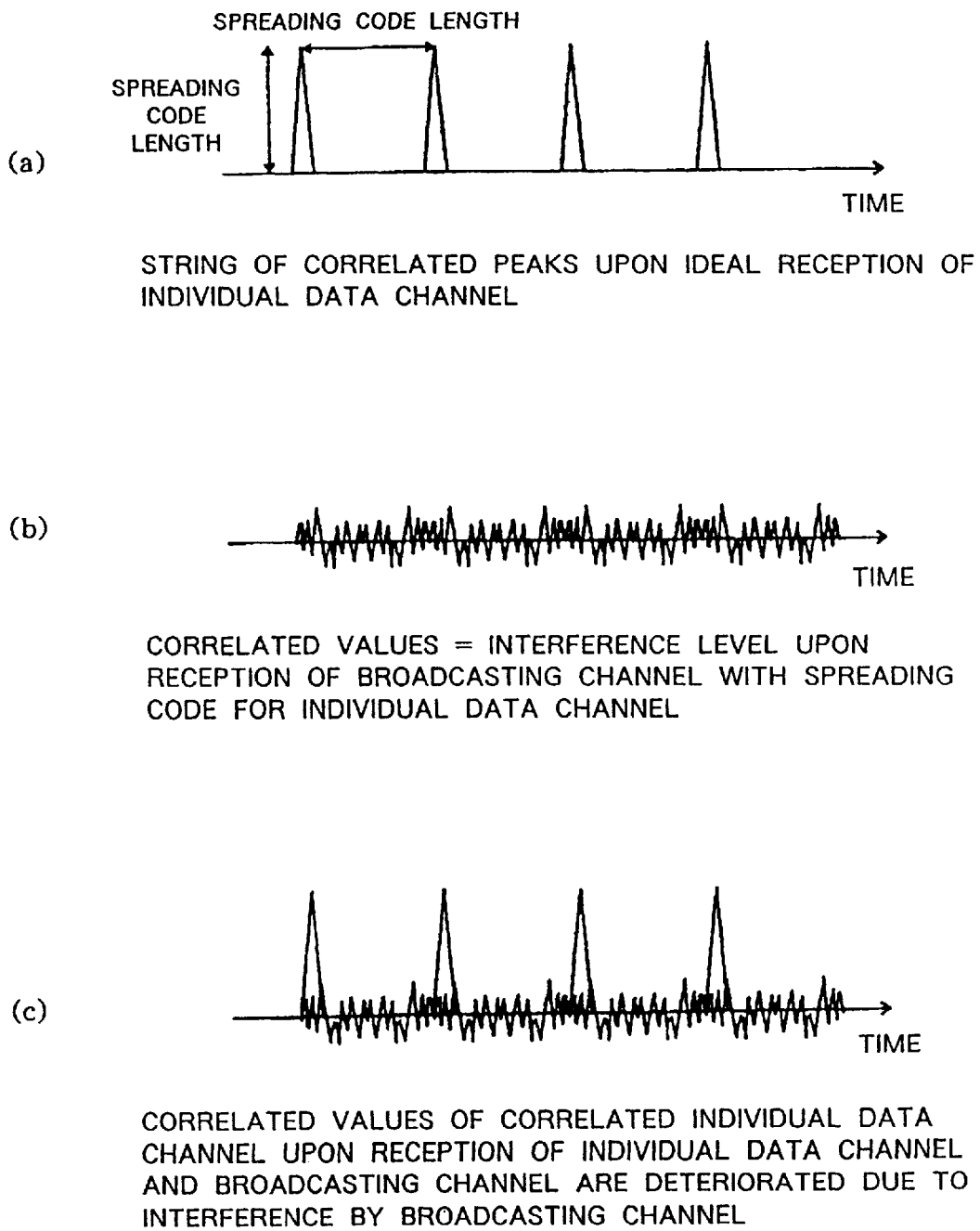
FIGS. 22(a) through 22(c) are diagrams that are illustrative of the manner in, which a spread broadcasting signal interferes with a spread data signal.

The BCCH spreading code generator 4 generates a spreading code which is the same as the long code mask symbol shown in FIG. 19, for example, and the BCCH spreading code generator 4 outputs the generated spreading code as a canceling BCCH code to the complex multiplier 5. As described above with respect to the conventional system, the canceling BCCH code comprises the sum of a common short code and an inherent short code, and the canceling BCCH code has a constant waveform (the waveform of a spreading code itself) regardless of the information that is transmitted from the base station apparatus.

Figure 3:
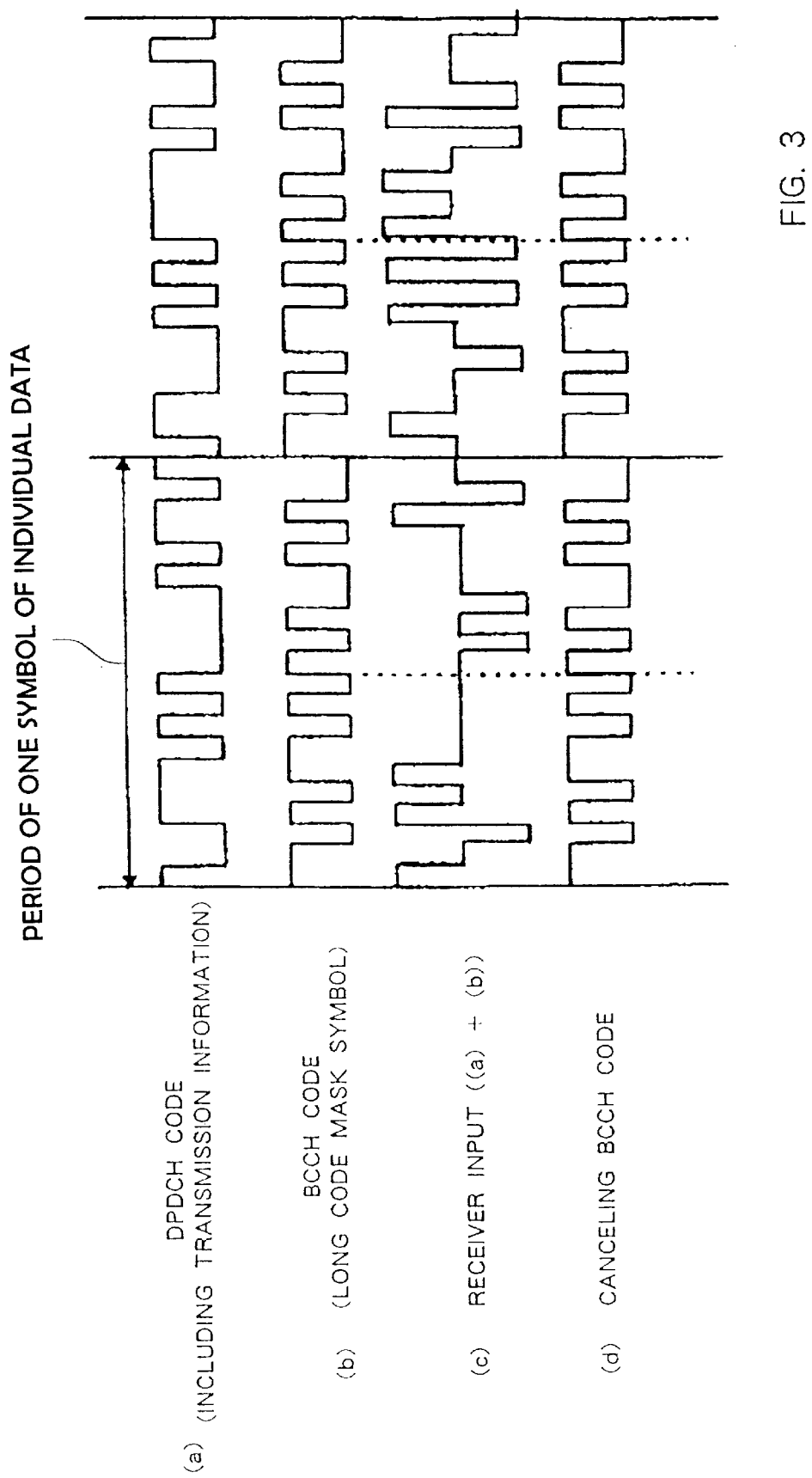
FIGS. 3(a) through 3(d) are diagrams showing signal waveforms that are illustrative of interference cancellation.

FIG. 3(a) shows an example of a spread data signal that is produced by spreading a data signal, i.e., the information that is transmitted from the base station apparatus, with a data signal spreading code. FIG. 3(b) shows an example of a spreading code of a long code mask symbol. FIG. 3(c) shows an example of a sum signal representing the signal shown in FIG. 3(a) and the signal shown in FIG. 3(b) being linearly added, i.e., multiplexed, by the base station apparatus. The sum signal is received by the CDMA mobile station apparatus according to the first embodiment. FIG. 3(d) shows an example of the above-described canceling BCCH code. The canceling BCCH code is identical to the spreading code shown in FIG. 3(b). For illustrative purpose, the waveforms shown in FIGS. 3(a) through 3(d) are free of the phase rotation as referred to above.

Figure 4:
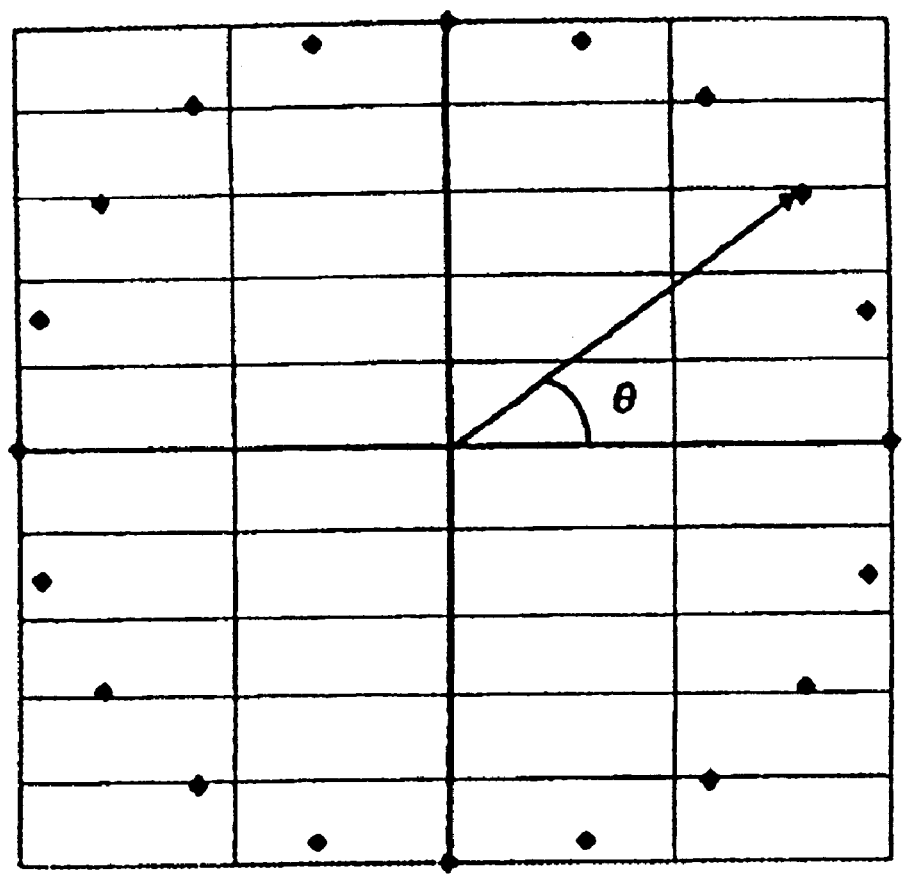
FIG. 4 is a diagram showing an example of the relationship between phase rotation and θ.

The complex multiplier 5 imparts phase rotation to the canceling BCCH code that is outputted from the BCCH spreading code generator 4, and the complex multiplier 5 outputs the resultant canceling BCCH code to the subtractors 7, 8. In the first embodiment, the subtractor 7 corresponds to the I-phase and imparts a phase rotation of $\cos\theta$ to the cancelling BCCH code inputted to the subtractor 7, and the other subtractor 8 corresponds to the Q-phase and imparts a phase rotation of $\sin\theta$ to the canceling BCCH code inputted to the subtractor 8. FIG. 4 shows an example of such phase rotation in a phase plane.

A process that is carried out by the complex multiplier 5 for imparting a phase rotation to the canceling BCCH code will be described below.

In the first embodiment, it is assumed that variations in the amount of phase rotation in the radio transmission path are small in one spreading code period of the canceling BCCH code, and the complex multiplier 5 imparts the amount of phase rotation that is detected by the BCCH demodulation unit 3 to the canceling BCCH code based on the information of the amount of phase rotation outputted from the BCCH demodulation unit 3.

Thus, by imparting the above-described amount of phase rotation, the complex multiplier 5 can impart the same, or substantially the same, amount of phase rotation to the canceling BCCH code as the amount of phase rotation that the long code mask symbol that is included in the received signal has suffered in the radio transmission path. In this manner, the complex multiplier 5 can output the canceling BCCH code which has compensated for the phase rotation that is caused in the radio transmission path to the subtractors 7, 8 depending on the accuracy of the estimated transmission path, i.e., the estimated amount of phase rotation, as detected in the BCCH demodulation unit 3.

An amount of phase rotation at each time point, e.g., each chip or sampling time point, within one spreading code period of the canceling BCCH code may be calculated from the amount of phase rotation that is detected by the BCCH demodulation unit 3, for example, so as to obtain a finer compensation for the phase rotation.

The subtractors 7, 8 are supplied with the I- and Q-phase received signal outputted from the reception unit 2, respectively and the subtractors are also supplied with I- and Q-phase canceling BCCH code outputted from the complex multiplier 5, respectively. The subtractors 7,8 subtract the canceling BCCH code from the received signal, and output the I- or Q-phase difference to the complex correlation unit 9. As described above, one of the subtractors 7, 8 corresponds to the I-phase, and the other subtractor corresponds to the Q-phase.

The complex correlation unit 9 generates a data signal spreading code, acquires correlated values, i.e., the I- and Q-phase correlated values between the I- and Q-phase signals that are outputted from the subtractors 7, 8 and the data signal spreading code, and outputs the correlated values to the data demodulation unit 10. While the complex correlation unit 9 handles the received signal, i.e., the received signal from which the canceling BCCH code has been subtracted, as a complex signal, the complex correlation unit 9 operates in the same manner as with a real correlator for acquiring the correlated values.

The data demodulation unit 10 compares the correlated values outputted from the complex correlation unit 9 with a predetermined reference value so as to demodulate the data signal, and the data demodulation unit 10 decodes and outputs data of a signal or channel corresponding to the data signal spreading code that is used in the complex correlation unit 9. As with the BCCH demodulation unit 3, the data demodulation unit 10 detects a phase variation in the radio transmission path of the received spread data signal in a coherent detection process that is carried out in demodulating the data signal.

When the CDMA mobile station apparatus according to the first embodiment receives a spread broadcasting signal and a spread data signal from the base station apparatus via a radio transmission path, the CDMA mobile station apparatus compensates for a phase rotation that is caused in the radio transmission path, cancels a long code mask symbol in the spread broadcasting signal that is included in the received signal as an interference signal with the canceling BCCH code, and demodulates the received signal from which the interference signal has been canceled into a data signal.

Since the CDMA mobile station apparatus of the first embodiment demodulates the received signal into the data signal after having canceled the long code mask symbol, which would otherwise act as a particularly large interference signal (interference power) with respect to the spread data signal, from the received signal, the accuracy with which the data signal is demodulated, i.e., the reception quality of the data signal, is increased. If the long code mask symbol has a constant waveform irrespective of the information that is transmitted from the base station apparatus, then the waveform that is generated by the CDMA mobile station apparatus may be subtracted directly from the received signal. Therefore, the processing rate can be increased. If another portion of the spread broadcasting signal other than the long code mask symbol is to be subtracted from the received signal, then the information transmitted from the base station apparatus is decoded so as to generate the waveform of the other portion. Therefore, the received signal needs to be temporarily stored in a delay device such as a memory or the like.

The CDMA mobile station apparatus according to the first embodiment compensates for the phase rotation of the long code mask symbol that is caused in the radio transmission path so as to generate the same, or substantially the same, canceling BCCH code as the waveform of the long mask code symbol that is included in the received signal. Therefore, the accuracy with which to cancel interference can be further improved.

In the first embodiment, the phase rotation of the long code mask symbol is compensated for by using the amount of phase rotation that is detected by the BCCH demodulation unit 3. However, the phase rotation of the long code mask symbol may be compensated for by using the amount of phase rotation detected by the data demodulation unit 10. This is because the spread broadcasting signal and the spread data signal are transmitted from the same base station apparatus in the same time zone and in the same frequency band, and hence, the amount of phase rotation of the spread broadcasting signal and the amount of phase rotation of the spread data signal are usually substantially equal to each other.

In the first embodiment, the spreading code of the long code mask symbol corresponds to a non-orthogonal spreading code that is non-orthogonal with the data signal spreading code, and the long code mask symbol corresponds to a non-orthogonal spread signal that is generated by using the non-orthogonal spreading code.

In the first embodiment, the BCCH spreading code generator 4 generates the canceling BCCH code by using the spreading code of the long code mask symbol, and the BCCH spreading code generator 4 serves as a non-orthogonal spreading code generating means. Further, in the first embodiment, the complex multiplier 5 imparts a phase rotation to the canceling BCCH code that is generated by the BCCH spreading code generator 4 so that the non-orthogonal spreading code generating means generates the non-orthogonal spreading code in which the phase rotation is compensated for.

In the first embodiment, the subtractors 7, 8 subtract the canceling BCCH code from the received signal, and hence, the subtractors 7, 8 serve as a subtracting means.

In the first embodiment, the complex correlation unit 9 and the data demodulation unit 10 demodulate the received signal from which the interference has been canceled into the data signal using the data signal spreading code, and hence, the complex correlation unit 9 and the data demodulation unit 10 serve as a data signal demodulating means. Demodulating the difference that is outputted from the subtracting means into the data signal may be equivalent to both demodulating the difference directly into the data signal and demodulating the difference after the difference has been processed in some way.

Second Embodiment

A CDMA mobile station apparatus according to a second embodiment of the present invention will be described below. Since the present invention is directed to an arrangement of a reception section of a CDMA mobile station apparatus, such an arrangement will primarily be described below.

Figure 5:
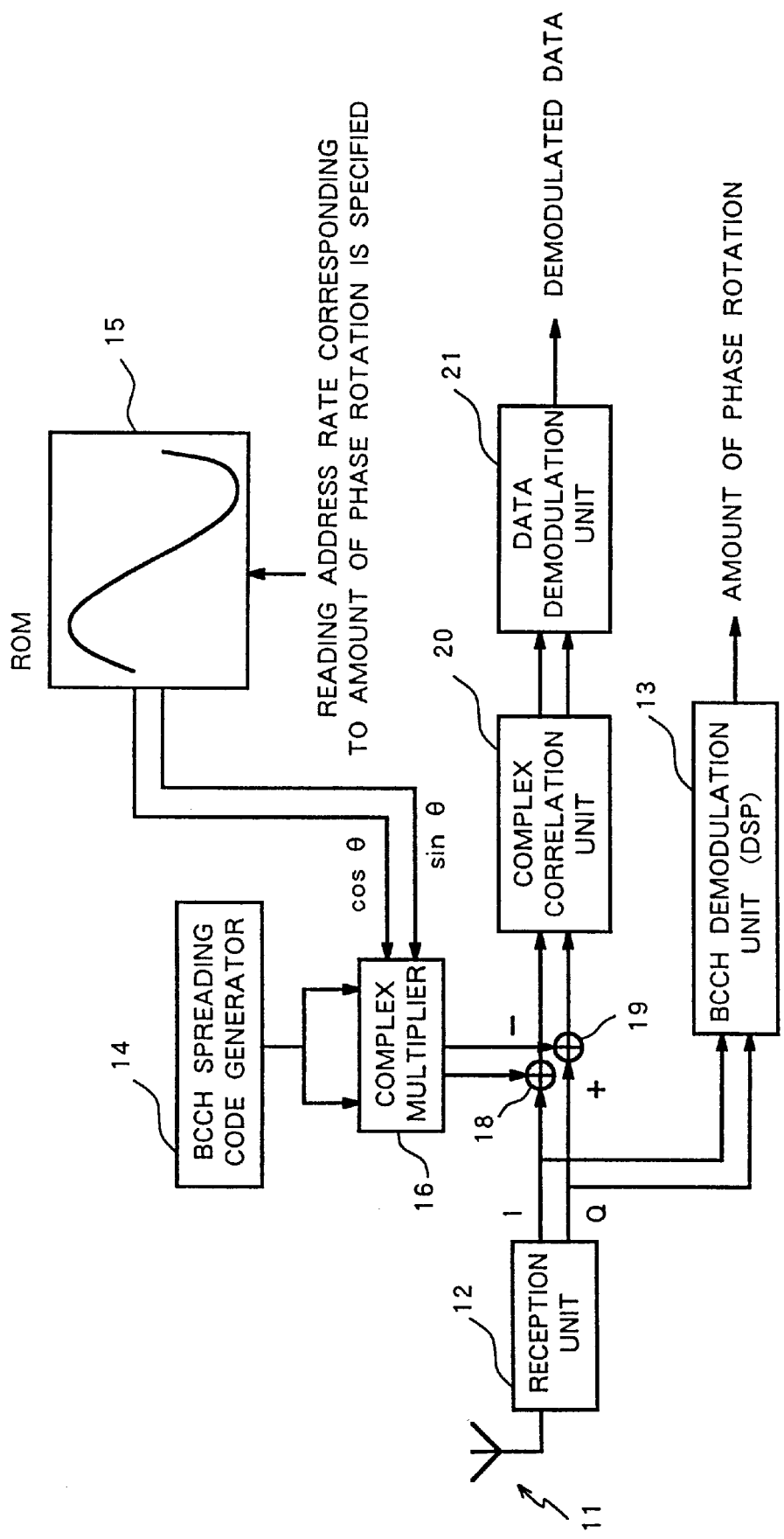
FIG. 5 is a block diagram of a CDMA mobile station apparatus according to a second embodiment of the present invention.

FIG. 5 shows a receiver in the CDMA mobile station apparatus according to the second embodiment of the present invention. As shown in FIG. 5, the receiver has an antenna 11, a reception unit 12, a BCCH demodulation unit 13, a BCCH spreading code generator 14, a complex multiplier 16, two subtractors 18, 19, a complex correlation unit 20, and a data demodulation unit 21, which are the same as those of the receiver of the first embodiment shown in FIG. 1. In addition, the receiver of the second embodiment shown in FIG. 5 has a ROM (Read-Only Memory) 15.

Details of the receiver shown in FIG. 5 that are different from those of the receiver of the first embodiment shown in FIG. 1 will primarily be described below.

Figure 6:
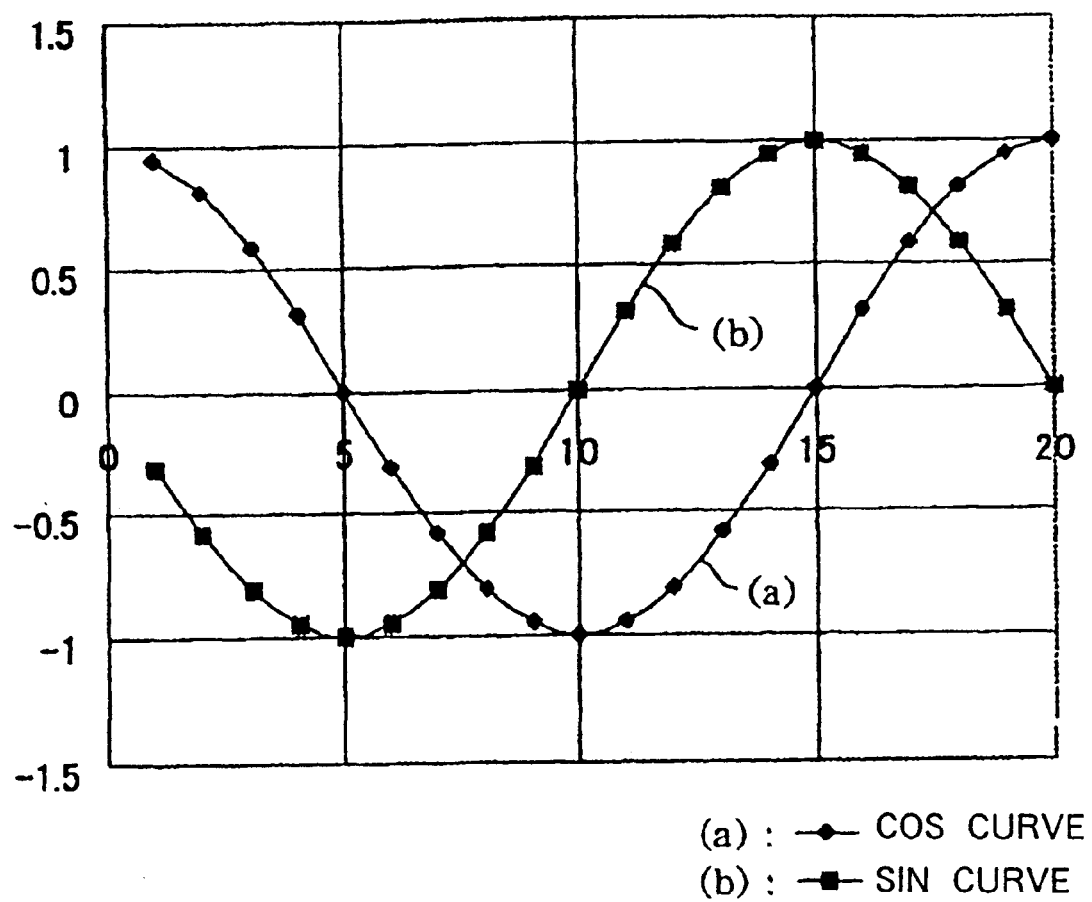
FIG. 6 is a diagram showing a sine waveform used for phase rotation compensation.

The ROM 15 comprises a ROM which stores a sine waveform. The ROM 15 generates a cos θ waveform and a sin θ waveform from the stored waveform and outputs the generated waveforms to the complex multiplier 16 under the control of the BCCH demodulation unit 13. FIG. 6 shows the cos θ waveform (cos curve) (a) and the sin θ waveform (sin curve) (b) by way of an example. Since the cos θ waveform and the sin θ waveform are 90° out of phase with each other, the cos θ and sin θ waveforms can be generated from one sin θ waveform.

A process for the ROM 15 to generate the cos θ waveform and the sin θ waveform will be described below.

The BCCH demodulation unit 13 controls the ROM 15 to output the cos θ waveform and the sin θ waveform based on the detected amount of phase rotation of the long code mask symbol so as to compensate for the amount of phase rotation. Specifically, the BCCH demodulation unit 13 outputs information representing the initial phase that is calculated from the detected amount of phase rotation and information representing an address counting-up rate to the ROM 15.

The information representing the initial phase comprises information for specifying the phase of a sampling point, i.e., information for specifying a point from which to read the waveform, to be outputted from among sampling points of the sine waveform that is stored in the ROM 15, and the information representing the address counting-up rate comprises information for specifying the rate of updating the address of a sampling point, i.e., information for specifying how far the address is to be advanced for reading the waveform next time, to be outputted from the ROM 15.

For example, if the counting-up rate is increased, then the distance between sampling points on the sine waveform to be read from the ROM 15 is increased; and if the counting-up rate is reduced, then the distance between sampling points on the sine waveform to be read from the ROM 15 is reduced. Stated otherwise, if the counting-up rate of the address counter for the ROM 15 is increased, the amount of phase rotation that occurs from one reading point to the next reading point is increased; and if the counting-up rate of the address counter for the ROM 15 is reduced, the amount of phase rotation that occurs from one reading point to the next reading point is reduced. The amount of phase rotation that the received signal is subjected to is generally an analog quantity that changes continuously. The counting-up rate is determined based on the rate of change of the amount of phase rotation.

According to the above-described control process, the ROM 15 outputs the waveform value of a sampling point as an initial sampling point of the initial phase which is indicated by the BCCH demodulation unit 13. The address generated by the address counter is updated at the counting-up rate which is indicated by the BCCH demodulation unit 13, and the ROM 15 outputs the waveform values of sampling points corresponding to the successively updated addresses. The waveform values are outputted for both the sin θ waveform and the cos θ waveform so that the sin θ waveform and the cos θ waveform for compensating for the phase rotation that has occurred in the radio transmission path are outputted to the complex multiplier 16.

The complex multiplier 16 operates for each chip or each sampling point, and imparts the phase rotation that is supplied from the ROM 15 to the canceling BCCH code.

The CDMA mobile station apparatus of the above-described arrangement according to the present embodiment compensates for the amount of phase rotation at each time point, e.g., each chip or sampling time point, within one spreading code period of the canceling BCCH code with the data from the ROM 15, cancels the canceling BCCH code whose amount of phase rotation has been compensated for as an interference signal from the received signal, and demodulates the received signal into a data signal.

Therefore, the CDMA mobile station apparatus according to the second embodiment can compensate for small changes in the amount of phase rotation within one spreading code period of the canceling BCCH code. Since the CDMA mobile station apparatus according to the second embodiment compensates for such small changes in the amount of phase rotation by using the ROM 15 as a hardware circuit, the power consumption can be made smaller than if small amounts of phase rotation were computed by using a DSP which consumes a relatively large amount of power.

In the second embodiment, the accuracy with which to cancel interference is increased by compensating for small changes in the amount of phase rotation which thereby increases the accuracy with which to demodulate the data signal. However, even though a memory such as a ROM for storing waveforms is employed, the CDMA mobile station apparatus may be arranged to compensate for an amount of phase rotation which is regarded as being constant within one spreading code period of the canceling BCCH code. With such an arrangement, the power consumption may be made smaller than if small changes in the amount of phase rotation are compensated for.

It is also possible to compensate for the amount of phase rotation that is detected by the data demodulation unit 21 similar to the first embodiment.

Third Embodiment

A CDMA mobile station apparatus according to a third embodiment of the present invention will be described below. Since the present invention is directed to an arrangement of a reception section of a CDMA mobile station apparatus, such an arrangement will primarily be described below.

The receiver of the CDMA mobile station apparatus according to the third embodiment is basically the same as the receiver of the CDMA mobile station apparatus according to the first embodiment shown in FIG. 1, but is characterized in an arrangement for the BCCH spreading code generator 4 shown in FIG. 1. The arrangement for the BCCH spreading code generator 4 according to the third embodiment will primarily be described below. For illustrative purpose, the BCCH spreading code generator according to the third embodiment is denoted by the same reference numeral as the reference numeral of the BCCH spreading code generator according to the first embodiment.

Figure 7:
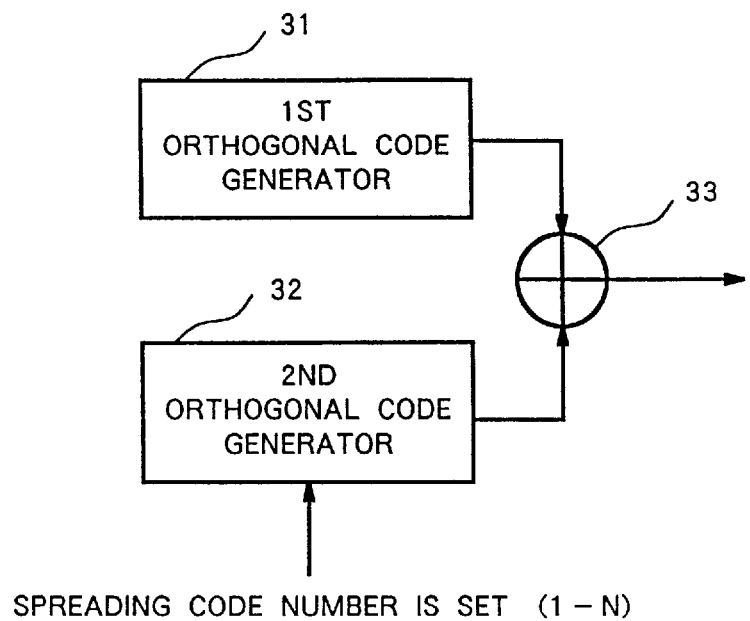
FIG. 7 is a block diagram of a BCCH spreading code generator according to a third embodiment of the present invention.

FIG. 7 shows the arrangement for the BCCH spreading code generator 4 according to the third embodiment. As shown in FIG. 7, the BCCH spreading code generator 4 comprises a first orthogonal code generator 31, a second orthogonal code generator 32, and an adder 33.

The first orthogonal code generator 31 generates one type of spreading code (common short code) that is shared by CDMA radio communication systems for the CDMA mobile station apparatus according to the third embodiment, and the first orthogonal code generator 31 outputs the generated spreading code to the adder 33.

The second orthogonal code generator 32 is controlled by the software of a controller (not shown) of the CDMA mobile station apparatus according to the third embodiment so as to selectively generate a plurality of types of spreading codes (inherent short codes) for respective base station apparatus or sectors, and to output the generated spreading codes to the adder 33.

A process of controlling the second orthogonal code generator 32 to selectively generate a plurality of types of inherent short codes will be described below.

The second orthogonal code generator 32 comprises a shift register, for example. The controller sets an initial value of the shift register to one of a number of values corresponding to the inherent short codes, e.g., spreading code numbers 1 through N, so as to thereby generate a desired inherent short code with the shift register.

The desired inherent short code is a spreading code corresponding to the base station apparatus or sector to which the CDMA mobile station apparatus according to the third embodiment is connected, i.e., the base station apparatus or sector which accommodates the CDMA mobile station apparatus according to the third embodiment. The spreading code is determined by the controller, for example. Specifically, as the base station apparatus or sector changes, the controller changes the inherent short code that is generated by the second orthogonal code generator 32. If the base station apparatus or sector does not change, then the controller does not need to change the inherent short code that is generated by the second orthogonal code generator 32.

The adder 33 adds the common short code that is outputted from the first orthogonal code generator 31 and the inherent short code that is outputted from the second orthogonal code generator 32, and the adder 33 outputs the sum thereof to the complex multiplier 5. The sum of the common short code and the inherent short code serves as the long code mask symbol, i.e., the canceling BCCH code.

Figure 8:
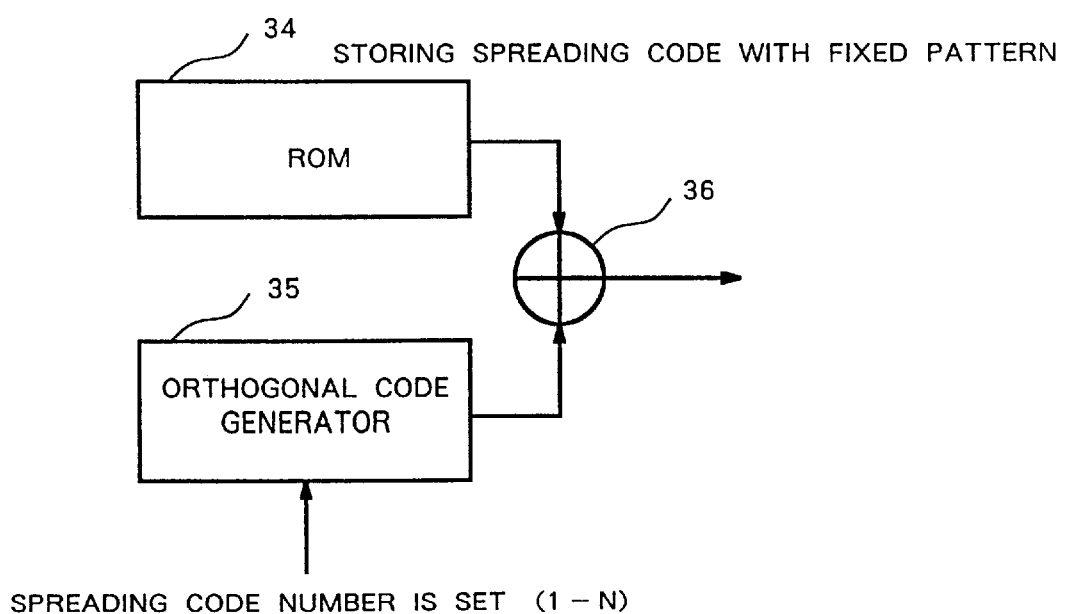
FIG. 8 is a block diagram of another BCCH spreading code generator according to the third embodiment of the present invention.

FIG. 8 shows another arrangement for the BCCH spreading code generator 4 according to the third embodiment. As shown in FIG. 8, the BCCH spreading code generator 4 comprises a ROM 34, an orthogonal code generator 35 which is similar to the second orthogonal code generator 32 shown in FIG. 7, and an adder 36 which is similar to the adder 33 shown in FIG. 7.

With the arrangement shown in FIG. 8, in view of the fact that the common short code generated by the first orthogonal code generator 31 shown in FIG. 7 is shared by systems, a common short code having a certain fixed pattern is stored in the ROM 34. The ROM 34 outputs the stored common short code to the adder 36.

In the CDMA mobile station apparatus according to the third embodiment, a plurality of inherent short codes are selectively generated by one orthogonal code generator 32 or 35 so as to generate the canceling BCCH code.

Therefore, the CDMA mobile station apparatus according to the third embodiment is simpler in structure than if different inherent short codes are respectively generated by a plurality of (N) orthogonal code generators.

In the arrangements shown in FIGS. 7 and 8, the BCCH spreading code generator has two orthogonal code generators or one orthogonal code generator and a ROM. If diversity handover is performed for connecting the CDMA mobile station apparatus to a plurality of, e.g., two, base station apparatus at the same time, then the BCCH spreading code generator has an additional orthogonal code generator for generating an inherent short code.

Fourth Embodiment

A CDMA mobile station apparatus according to a fourth embodiment of the present invention will be described below. Since the present invention is directed to an arrangement of a reception section of a CDMA mobile station apparatus, such an arrangement will primarily be described below.

Figure 9:
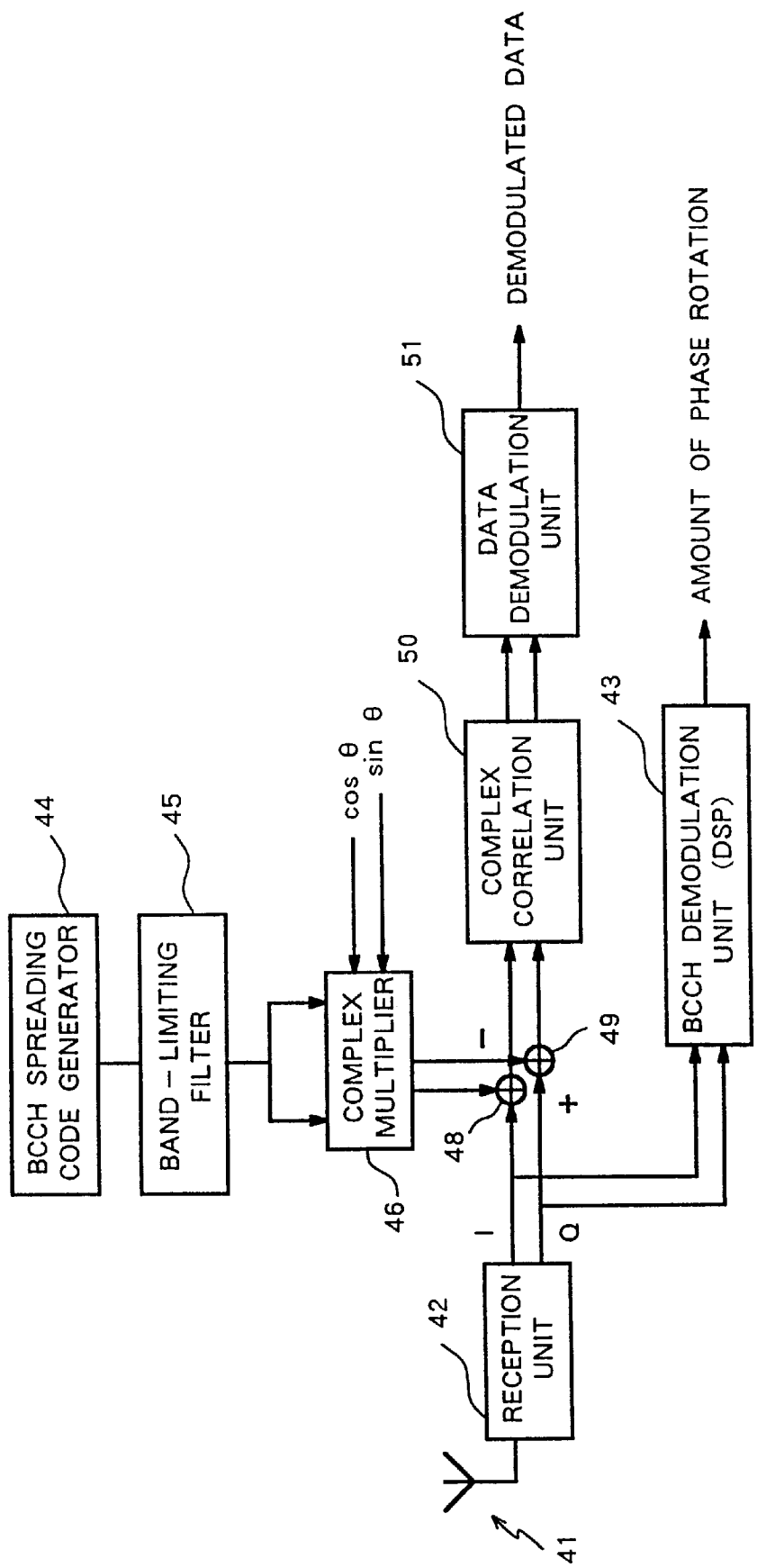
FIG. 9 is a block diagram of a CDMA mobile station apparatus according to a fourth embodiment of present invention.

FIG. 9 shows a receiver in the CDMA mobile station apparatus according to the fourth embodiment of the present invention. As shown in FIG. 9, the receiver has an antenna 41, a reception unit 42, a BCCH demodulation unit 43, a BCCH spreading code generator 44, a complex multiplier 46, two subtractors 48, 49, a complex correlation unit 50, and a data demodulation unit 51, which are the same as those of the receiver of the first embodiment shown in FIG. 1. In addition, the receiver of the fourth embodiment shown in FIG. 9 has a band-limiting filter 45 connected between the BCCH spreading code generator 44 and the complex multiplier 46.

Details of the receiver shown in FIG. 9 which are different from those of the receiver of the first embodiment shown in FIG. 1 will primarily be described below.

The BCCH spreading code generator 44 outputs a generated canceling BCCH code to the band-limiting filter 45.

The band-limiting filter 45 limits the band of the canceling BCCH code that is supplied from the BCCH spreading code generator 44, and the band-limiting filter 45 outputs the band-limited canceling BCCH code to the complex multiplier 46.

A process of the band-limiting filter 45 to limit the band of the canceling BCCH code will be described below.

Figure 10:
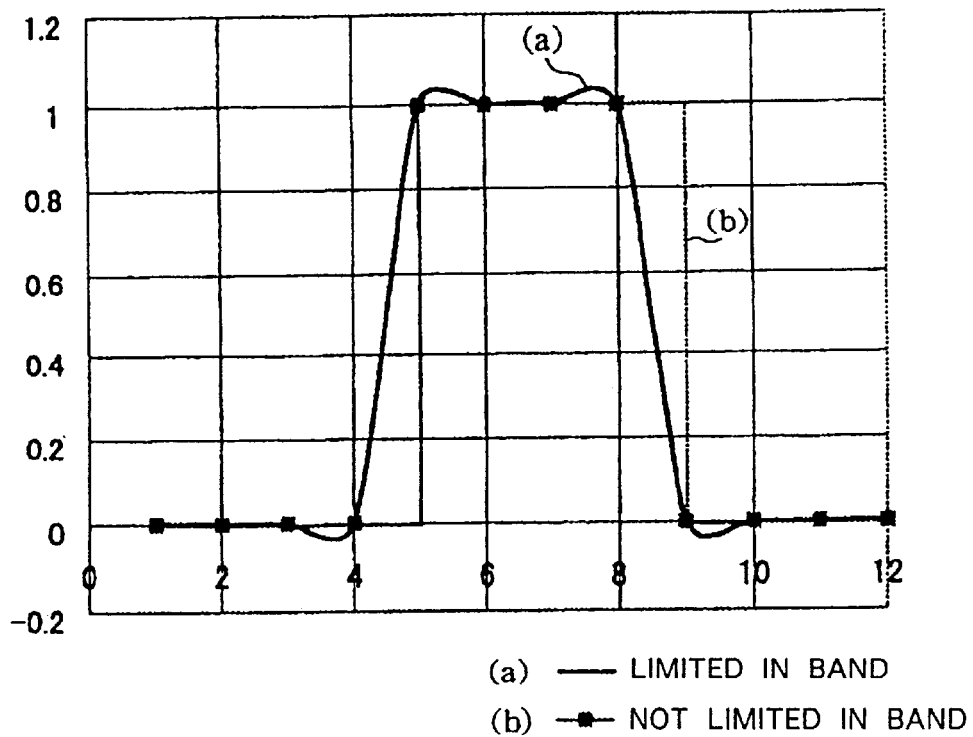
FIG. 10 is a diagram showing an example of a band-limited waveform and an example of a non-band-limited waveform.

Generally, it is customary in radio communications to limit the band of the waveform of a communication signal (digital signal) so as to make the waveform smoother. A signal that is outputted from a base station apparatus and received by the CDMA mobile station apparatus via a radio link is limited in band by the base station apparatus or the CDMA mobile station apparatus. FIG. 10 shows an example of the waveform of a band-limited signal (a) and an example of the waveform of a signal (b) that is not limited in band.

Figure 11:
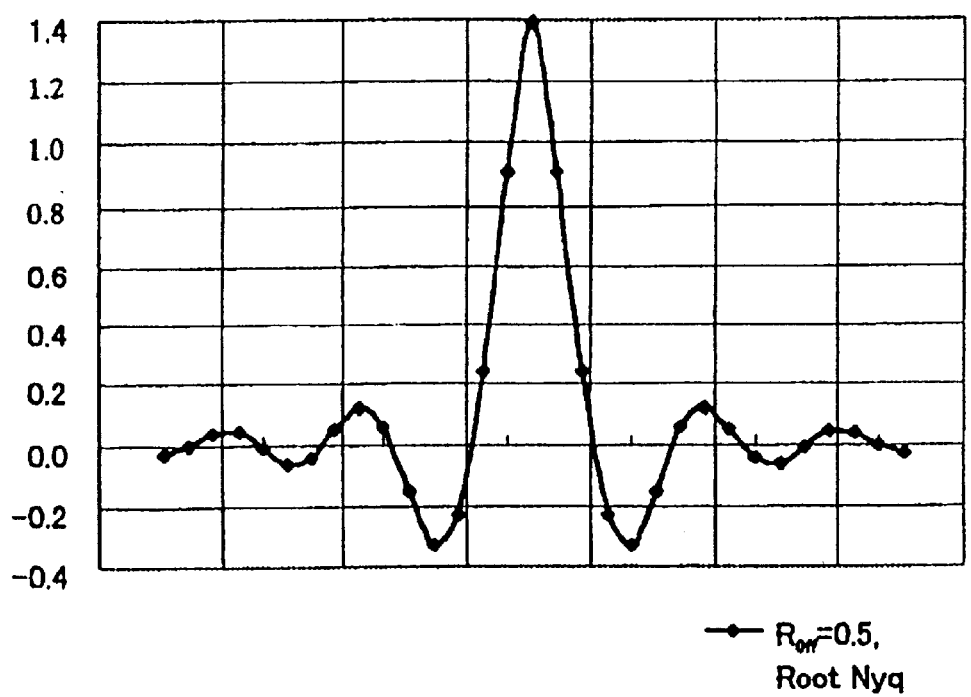
FIG. 11 is a diagram showing an example of a band-limiting impulse response waveform.

The band-limiting filter 45 limits the band of the canceling BCCH code so as to compensate for the band limitation that the communication signal is subjected to when the communication signal is transmitted or received. The band-limiting filter 45 may comprise a FIR (Finite Impulse Response) filter such as a transversal filter, for example, having a band-limiting impulse response waveform as shown in FIG. 11.

Alternatively, the band-limiting filter 45 may comprise a ROM filter having a waveform which is similar to the band-limiting impulse response waveform and which is stored in a ROM.

The complex multiplier 46 imparts phase rotation to the canceling BCCH code which has been limited in band by the band-limiting filter 45.

The CDMA mobile station apparatus according to the fourth embodiment limits the band of the canceling BCCH code, cancels the band-limited canceling BCCH code as an interference signal from a received signal, and demodulates the received signal into a data signal.

In the CDMA mobile station apparatus according to the fourth embodiment, even if a long code mask symbol that is included in the received signal has been limited in band, the accuracy with which to cancel interference can be increased by band-limiting the canceling BCCH code so as to compensate for the band limitation that the long code mask symbol has been subjected to, and as a result, the received signal can be demodulated into the data signal with increased accuracy. Even if changes are small in the waveform of the communication signal due to the band limitation being applied thereto, the canceling BCCH code should preferably be limited in band so as to increase the accuracy with which to cancel interference.

In the fourth embodiment, the band-limiting filter 45 limits the band of the canceling BCCH code that is generated by the BCCH spreading code generator 44, and thus, the band-limiting filter 45 is provided as a non-orthogonal spreading code generating means for generating a band-limited non-orthogonal spreading code.

Fifth Embodiment

A CDMA mobile station apparatus according to a fifth embodiment of the present invention will be described below. Since the present invention is directed to an arrangement of a reception section of a CDMA mobile station apparatus, such an arrangement will primarily be described below.

Figure 12:
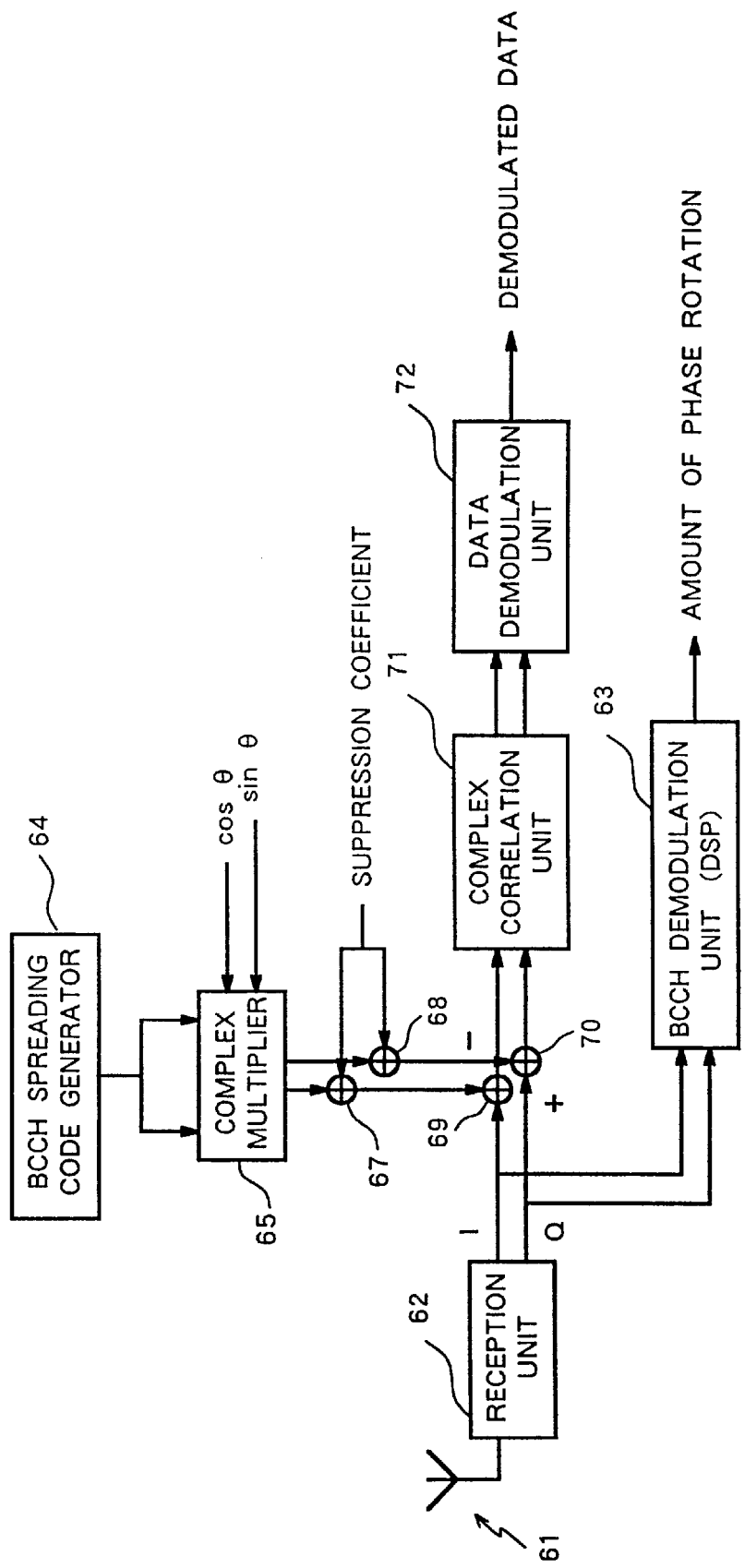
FIG. 12 is a block diagram of a CDMA mobile station apparatus according to a fifth embodiment of the present invention.

FIG. 12 shows a receiver in the CDMA mobile station apparatus according to the fifth embodiment of the present invention. As shown in FIG. 12, the receiver has an antenna 61, a reception unit 62, a BCCH demodulation unit 63, a BCCH spreading code generator 64, a complex multiplier 65 for compensating for phase rotation, two subtractors 67, 70, a complex correlation unit 71, and a data demodulation unit 72, which are the same as those of the receiver of the first embodiment shown in FIG. 1. In addition, the receiver shown in FIG. 12 has two multipliers 67, 68 for multiplying a suppression coefficient which are connected between the complex multiplier 65 and the subtractors 69, 70.

Details of the receiver shown in FIG. 12 which are different from those of the receiver of the first embodiment shown in FIG. 1 will primarily be described below.

The complex multiplier 65 for compensating for phase rotation outputs a canceling BCCH code that is subjected to phase rotation to the multipliers 67, 68.

The multipliers 67, 68 multiply the I- and Q-phase canceling BCCH codes that are outputted from the complex multiplier 65 by a predetermined suppression coefficient, and the multipliers 67, 68 output the I- and Q-phase products to the subtractors 69, 70, respectively. In the fifth embodiment, the multiplier 67 corresponds to the I-phase, and the multiplier 68 corresponds to the Q-phase. The suppression coefficient is shared by the I-phase and the Q-phase, and the suppression coefficient has a value greater than 0 and equal to or smaller than 1, for example.

The subtractors 69, 70 subtract the canceling BCCH code that is multiplied by the suppression coefficient from the received signal.

The suppression coefficient will be described below.

Generally, since noise signals and interference signals are present in an environment where radio communications are performed, the BCCH demodulation unit 63 and the data demodulation unit 72 are not necessarily able to detect a fully accurate amount of phase rotation, but the BCCH demodulation unit 63 and the data demodulation unit 72 usually detect an amount of phase rotation with an error, i.e., an estimated transmission path error. Because of such an error, an error is introduced between a long code mask symbol that is included in the received signal and the canceling BCCH code that is subtracted from the received signal.

If the canceling BCCH code is not limited in band when the communication signal is limited in band, then the canceling BCCH code that is subtracted from the received signal suffers an error with respect to a long code mask symbol that is included in the received signal.

When such an error occurs, the canceling BCCH code which has a greater signal intensity than the long code mask symbol that is included in the received signal or the canceling BCCH code which has a smaller signal intensity than the long code mask symbol that is included in the received signal is liable to be subtracted. In particular, if the canceling BCCH code which has a greater signal intensity than the long code mask symbol that is included in the received signal is subtracted, the accuracy with which to demodulate the received signal into the data signal is deteriorated, i.e., noise is intensified.

The problem of intensified noise has also arisen in the field of interference cancelers for base station apparatus that have been widely announced in recent years. For example, as described in "Approximate mutual correlation cancellation in asynchronous DS/CDMA system", Toshinori Suzuki, Yoshio Takeuchi, in "IEICE Technical Report, RCS96-34 (1996-06), for example, it is the general practice to cope with the above problem by using a suppression coefficient (referred to as a "transfer coefficient λ" in the above-described article). This paper shows that the suppression coefficient is highly effective.

According to the fifth embodiment, the same suppression coefficient as revealed in the above described paper is employed.

Specifically, the CDMA mobile station apparatus according to the fifth embodiment employs the suppression coefficient so as to suppress or reduce the signal intensity of the canceling BCCH code, cancels the canceling BCCH code whose signal intensity has been suppressed as an interference signal from a received signal, and demodulates the received signal into a data signal.

With the signal intensity suppressed as described above, if the transmission path is estimated precisely, then, the canceling BCCH code which have an excessively large signal intensity is not subtracted from the received signal although the canceling BCCH code which has a smaller signal intensity than the long code mask symbol that is included in the received signal is subtracted. Accordingly, the characteristics of interference cancellation are prevented from being deteriorated on the average. Therefore, the CDMA mobile station apparatus according to the fifth embodiment is capable of preventing the accuracy with which to demodulate the received signal into the data signal from being lowered even in a communication environment where there exists an estimated transmission path error.

Figure 13:
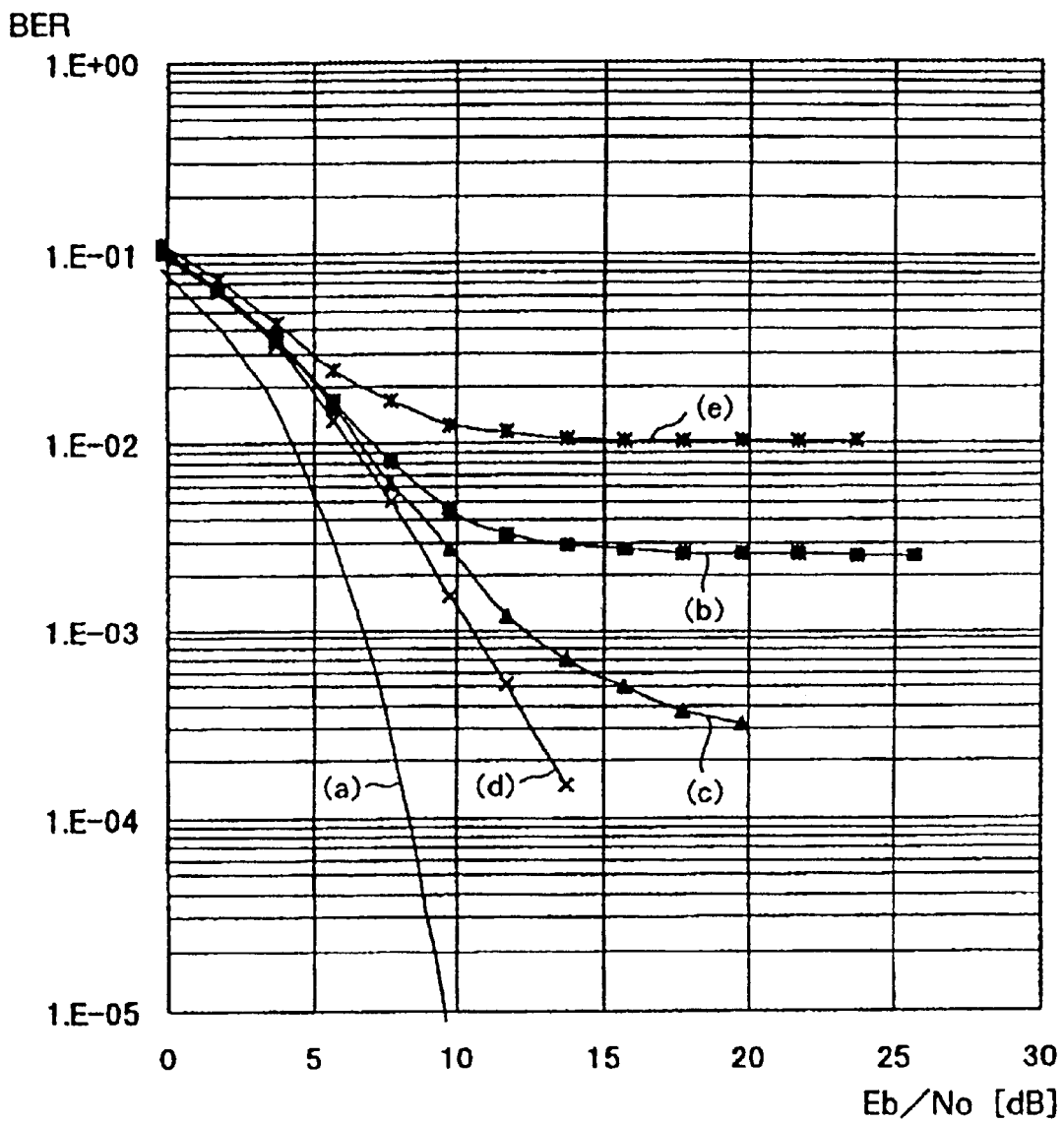
FIG. 13 is a diagram showing an example of effects achieved when suppression coefficients are employed.

FIG. 13 shows a graph of bit error rates of the data signal using suppression coefficients which were calculated according to a computer simulation. The graph shown in FIG. 13 has a horizontal axis representing the S/N rate [Eb/No dB] and a vertical axis representing the bit error rate (BER). The computer simulation was conducted under the condition of a static 1-path model and the condition that when a spread broadcasting signal and a spread data signal are received, the spread broadcasting signal was 6 dB higher than the spread data signal, and the symbol rate of the spread data signal was 256 ksps.

The graph shown in FIG. 13 illustrates a curve (a) indicating calculated results that are based on static characteristic theoretical values, a curve (b) indicating results that were calculated prior to an interference cancellation, a curve (c) indicating results that were calculated when a suppression coefficient of 0.5 was used, a curve (d) indicating calculated results when a suppression coefficient of 0.25 was used, and a curve (e) indicating results that were calculated when a suppression coefficient of 1.0 was used, i.e., no cancellation was made.

The calculated results shown in FIG. 13 have proven that the bit error rate can be reduced by suppressing the signal intensity using the suppression coefficient.

The suppression coefficient may be of a fixed value once the interference cancellation has been started. Generally, however, the preferable value of the suppression coefficient changes depending on the system usage and the number of mobile station apparatus, i.e., the number of users, connected to the base station apparatus or sector to which the CDMA mobile station apparatus according to the fifth embodiment are connected.

In the fifth embodiment, the multipliers 67, 68 multiply the canceling BCCH code that is generated by the BCCH spreading code generator 64 by the suppression coefficient, and thus, the multipliers 67, 68 are provided as a non-orthogonal spread signal generating means for generating a non-orthogonal spread signal whose signal intensity has been suppressed. In the fifth embodiment, the multipliers 67, 68 other than the complex multiplier 65 for compensating for phase rotation are provided so as to multiply the canceling BCCH code by the suppression coefficient. However, the cos θ and the sin θ for compensating for phase rotation may be multiplied by the suppression coefficient so as to cause the complex multiplier 65 to compensate for phase rotation and also to multiply the canceling BCCH code by the suppression coefficient.

Sixth Embodiment

A CDMA mobile station apparatus according to a sixth embodiment of the present invention will be described below. Since the present invention is directed to an arrangement of a reception section of a CDMA mobile station apparatus, such an arrangement will primarily be described below.

Figure 14:
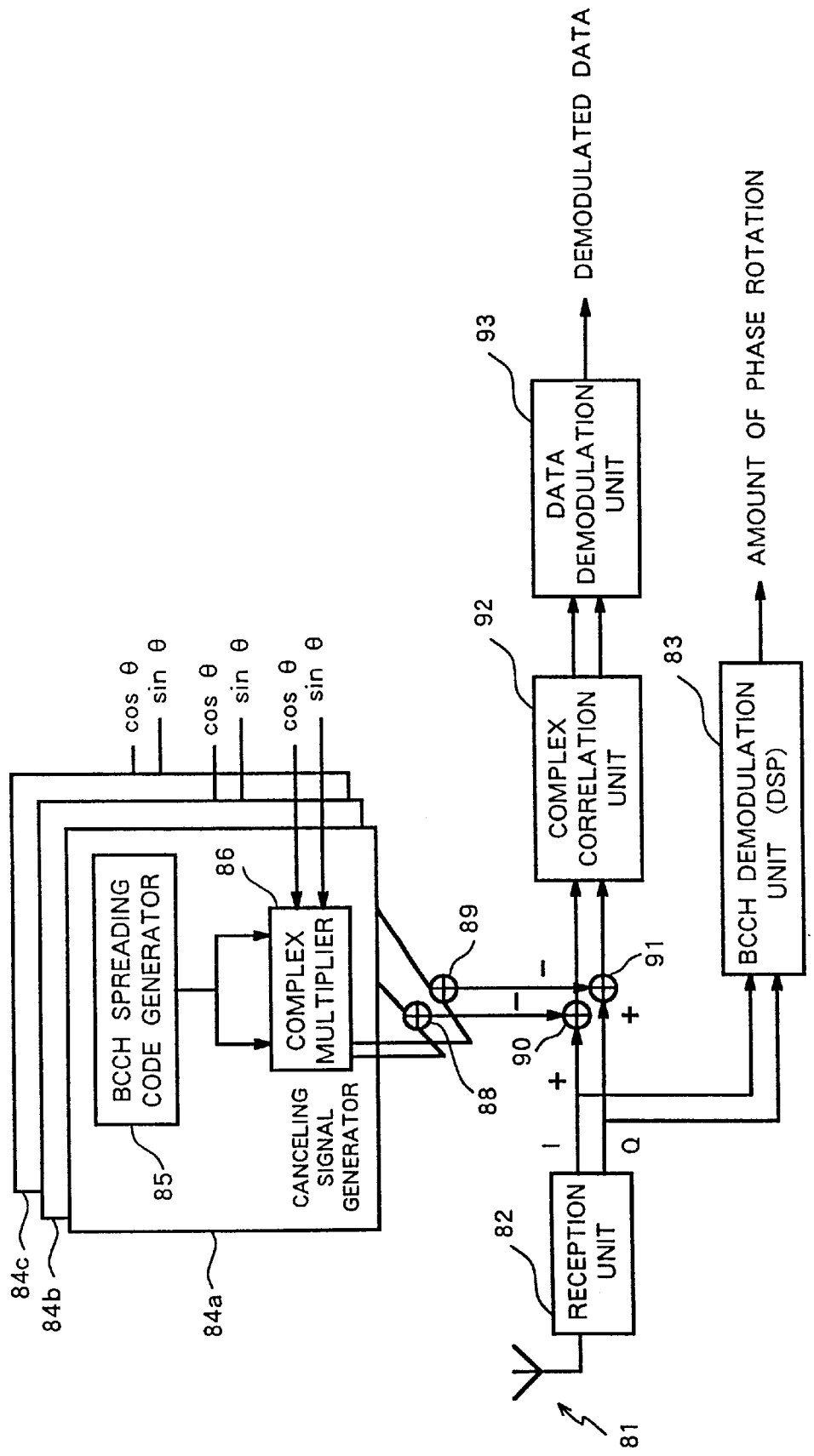
FIG. 14 is a block diagram of a CDMA mobile station apparatus according to a sixth embodiment of the present invention.

FIG. 14 shows a receiver in the CDMA mobile station apparatus according to the sixth embodiment of the present invention. As shown in FIG. 14, the receiver has an antenna 81, a reception unit 82, a BCCH demodulation unit 83, two:subtractors 90, 91, a complex correlation unit 92, and a data demodulation unit 93, which are the same as those of the receiver of the first embodiment shown in FIG. 1. In addition, the receiver of the sixth embodiment shown in FIG. 14 has a plurality of (three in the illustrated embodiment) canceling signal generators 84a, 84b, 84c each comprising a BCCH spreading code generator 85 and a complex multiplier 86 for compensating for phase rotation, and two adders 88, 89.

Details of the receiver of the sixth embodiment shown in FIG. 14 which are different from those of the receiver of the first embodiment shown in FIG. 1 will primarily be described below.

The CDMA mobile station apparatus according to the sixth embodiment is used in a multipath environment where a signal that is transmitted from a base station apparatus passes through a plurality of paths and is received via a radio link. In the sixth embodiment, the CDMA mobile station apparatus is capable of handling one direct wave and two delayed waves, i.e., a delayed wave 1 and a delayed wave 2. The delayed waves are produced when a radio signal is reflected by buildings and hills that are present in the radio transmission path. The BCCH demodulation unit 83 and the data demodulation unit 93 demodulate not only the direct wave but also the delayed waves for RAKE reception.

Figure 15:
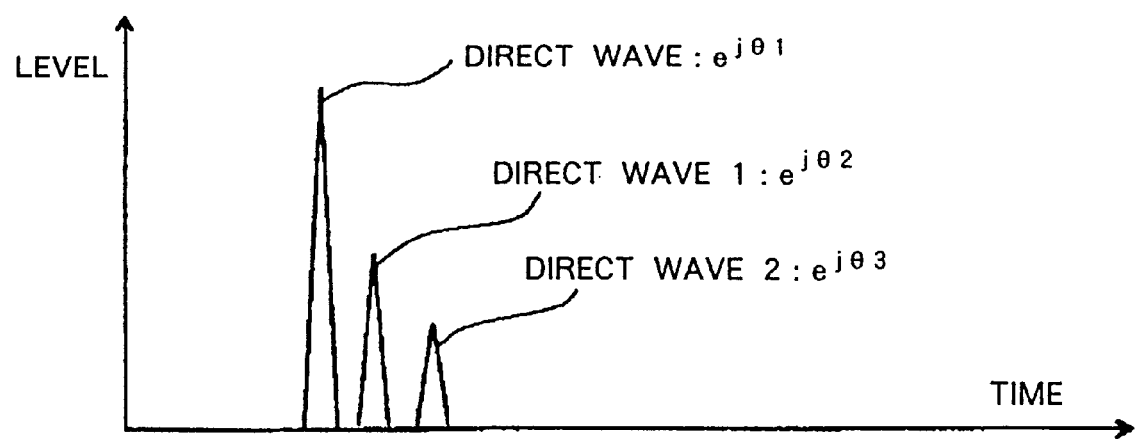
FIG. 15 is a diagram showing an example of an impulse response of a radio transmission path in a multipath environment.

FIG. 15 shows a direct wave and two delayed waves having different delay times. The graph shown in FIG. 15 has a horizontal axis representing time and a vertical axis representing a signal level. In FIG. 15, "$e^{j\theta 1}$", "$e^{j\theta 2}$", "$e^{j\theta 3}$", indicate rotational terms in a phase plane of the delayed wave 1 and the delayed wave 2, "j" indicates a symbol representing a complex number, and "θ1", "θ2", "θ3" indicate that "θ" shown in FIG. 4 has different values.

If delayed waves are present, then the characteristics of interference cancellation can be increased by canceling not only a long code mask symbol that is included in a direct wave, but also long code mask symbols that are included in the delayed waves that are received at the same time as an interference signal.

According to the sixth embodiment, the receiver shown in FIG. 14 has three canceling signal generators 84a–84c for three respective multipath signals including the direct wave and the two delayed waves.

Specifically, the BCCH spreading code generator 85 in each of the canceling signal generators 84a–84c generates canceling BCCH codes, i.e., codes of the same pattern in the sixth embodiment, for canceling long code mask symbols that are included in the respective multipath signals. The complex multiplier. 86 in each of the canceling signal generators 84a–84c imparts independent amounts θ1–θ3 corresponding to the phase rotations that are produced in the respective multipath signals to the canceling BCCH codes, respectively.

A process of detecting the number of multipath signals, i.e., the number of paths and delay times of the respective multipath signals, or an incoming path estimating process is normally carried out necessarily in the CDMA mobile station apparatus. The CDMA mobile station apparatus performs such an incoming path estimating process after the CDMA mobile station apparatus is turned on. In the sixth embodiment, the times to generate canceling BCCH codes with the canceling signal generators 84a–84c are adjusted depending on the delay times of the respective multipath signals that are detected according to the incoming path estimating process.

Generally, a plurality of ways of estimating an incoming path are known, and any of the known ways may be employed in the sixth embodiment. In the sixth embodiment, there is no limitation on the process of adjusting the times so as to generate canceling BCCH codes. Since arrival times and the amounts of phase rotation differ from multipath signal to multipath signal, and since the multipath signals also need to be processed at the same time, there is usually required as many canceling signal generators 84a–84c as the number of multipath signals to be handled.

The adders 88, 89 add I- and Q-phase canceling BCCH codes that are outputted from the complex multipliers 86 of the canceling signal generators 85, respectively, and the adders 88, 89 output the sums thereof, i.e., I- and Q-phase sums, to the subtractors 90, 91, respectively. In the sixth embodiment, the adder 88 corresponds to the I-phase and adds I-phase canceling BCCH codes, and the adder 89 corresponds to the Q-phase and adds Q-phase canceling BCCH codes.

The subtractors 90, 91 subtract the sums that are outputted from the adders 88, 89 from the received signal.

The CDMA mobile station apparatus according to the sixth embodiment adds a plurality of canceling BCCH codes corresponding to the long code mask symbols in a plurality of multipath signals that are included in a received signal, cancels the sum as an interference signal from the received signal, and demodulates the received signal into a data signal.

Inasmuch as the CDMA mobile station apparatus according to the sixth embodiment cancels interference in view of not only the direct wave that is included in the received signal but also the delayed waves that are included in the received signal, the characteristics of interference cancellation can be thereby increased so as to increase the accuracy with which to demodulate the received signal into the data signal.

Seventh Embodiment

A CDMA mobile station apparatus according to a seventh embodiment of the present invention will be described below. Since the present invention is directed to an arrangement of a reception section of a CDMA mobile station apparatus, such an arrangement will primarily be described below.

Figure 16:
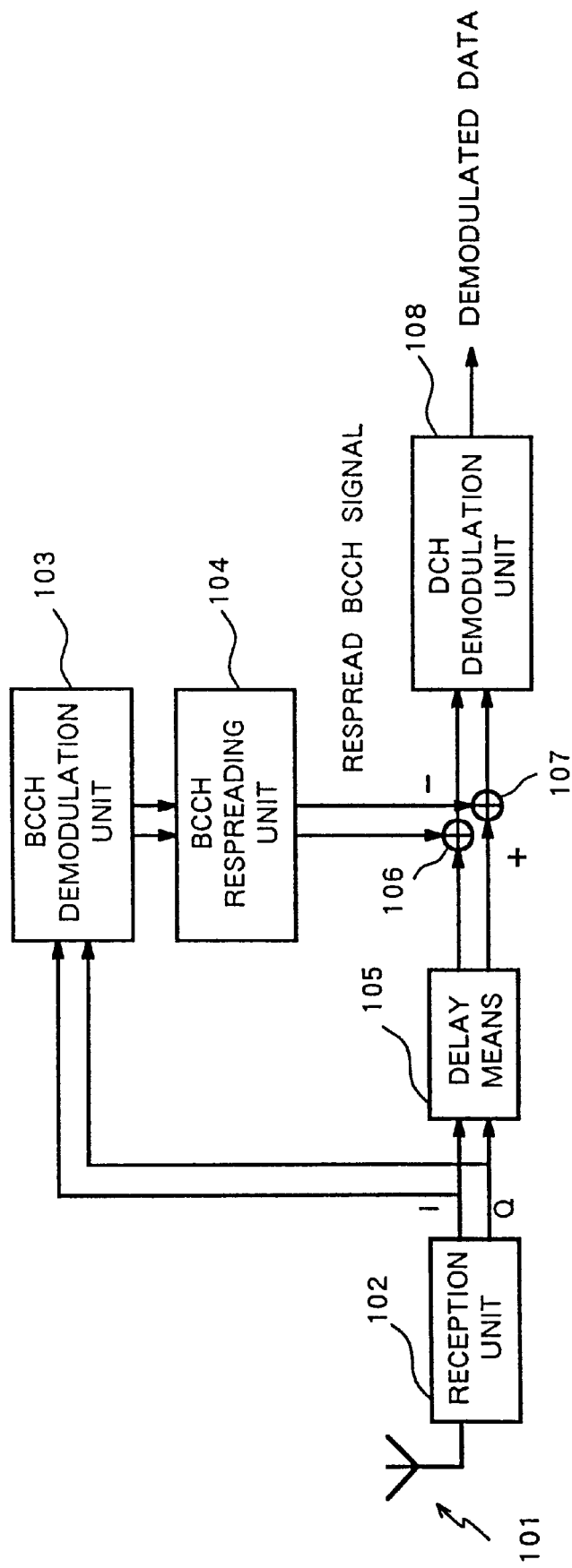
FIG. 16 is a block diagram of a CDMA mobile station apparatus according to a seventh embodiment of the present invention.

FIG. 16 shows a receiver in the CDMA mobile station apparatus according to the seventh embodiment of the present invention. As shown in FIG. 16, the receiver has an antenna 101, a reception unit 102 comprising a receiver unit, a BCCH demodulation unit 103 comprising a correlator and a demodulator, a BCCH respreading unit 104 comprising a spreader, a delay means 105 comprising a memory or the like for temporarily storing signals, two subtractors 106, 107, and a DCH demodulation unit 108 comprising a correlator and a demodulator.

The antenna 101 receives a signal that is transmitted from a base station apparatus, i.e., a CDMA base station apparatus, via a radio link, and the antenna 101 outputs the received signal to the reception unit 102. In the seventh embodiment, the antenna 101 receives a spread broadcasting signal and a spread data signal, which are similar to those described above with respect to the conventional system, in a superposed relationship to each other from the base station apparatus via a radio link.

The reception unit 102 extracts a signal in a predetermined reception frequency band from the signal that is outputted from the antenna 101, downconverts the extracted signal in a carrier frequency band into a baseband signal, and outputs the baseband signal to the BCCH demodulation unit 103 and the delay means 105. In the seventh embodiment, signals are subject to quadrature modulation for communications, and the reception unit 102 outputs the received signal as I-phase (in phase) and Q-phase (quadrature phase) signals. The BCCH demodulation unit 103 and the BCCH respreading unit 104 also process I- and Q-phase signals.

The BCCH demodulation unit 103 despreads the received I- and Q-phase signals that are outputted from the reception unit 102 with a broadcasting signal spreading code to thereby demodulate the received signal into a broadcasting signal, and the BCCH demodulation unit 103 outputs decoded I- and Q-phase broadcasting data to the BCCH respreading unit 104. As described above with respect to the first embodiment, the received signal undergoes phase rotation caused by the transmission path. In a coherent detection process that is carried out in demodulating the received signal into the broadcasting signal, the BCCH demodulation unit 103 detects a phase variation in the radio transmission path of the received spread broadcasting signal. Based on the detected phase variation, the BCCH demodulation unit 103 outputs information representing the amount of phase rotation in the radio transmission path of the received spread broadcasting signal to the BCCH respreading unit 104.

The BCCH respreading unit 104 respreads the broadcasting signal, i.e., the decoded broadcasting data, that is outputted from the BCCH demodulation unit 103, so as to generate a spread broadcasting signal, and the BCCH respreading unit 104 outputs the generated spread broadcasting signal, i.e., the I- and Q-phase spread broadcasting signals, as a respread BCCH signal to the subtractors 106, 107. In generating the respread BCCH signal, the BCCH respreading unit 104 compensates for a phase rotation of the respread BCCH signal based on information of the amount of phase rotation that is outputted from the BCCH demodulation unit 103. Details of the compensation for phase rotation are the same as those described above with respect to the first embodiment.

The delay means 105 delays the I- and Q-phase received signals from the reception unit 102, and the delay means 105 outputs the delayed signals to the subtractors 106, 107 a respectively. The delay means 105 delays the I- and Q-phase received signals for a period of time that is set so as to allow the subtractors 106, 107 to remove the spread broadcasting signal that is included in the received signal in view of the times that are required for the BCCH demodulation unit 103 and the BCCH respreading unit 104 to perform their respective processing. The delay means 105 is not limited to a memory, but may be any delay element.

The subtractors 106, 107 are respectively supplied with the I- and Q-phase received signals that are outputted from the delay means 105 and the I- and Q-phase respread BCCH signals that are outputted from the BCCH respreading unit 104. The subtractors 106, 107 then subtract the respread BCCH signals from the received signals, and output the I- and Q-phase difference signals to the DCH demodulation unit 108. In the seventh embodiment, the subtractor 106 corresponds to the I-phase, and the subtractor 107 corresponds to the Q-phase.

The DCH demodulation unit 108 acquires correlated values between the I- and Q-phase signals that are outputted from the subtractors 106, 107 and the data signal spreading code, i.e., I- and Q-phase correlated values, compares the correlated values with a predetermined reference value so as to demodulate the data signal, and decodes and outputs data of a signal or channel corresponding to the data signal spreading code that is used in the calculation of the correlated values.

With the above-described arrangement, when the CDMA mobile station apparatus according to the seventh embodiment receives a spread broadcasting signal and a spread data signal from the base station apparatus via a radio link, the CDMA mobile station apparatus compensates for a phase rotation that is caused by the radio transmission path, cancels the entire spread broadcasting signal that is included in the received signal as an interference signal from the respread BCCH signal, and demodulates the received signal from which the interference has been canceled into the data signal.

Since the CDMA mobile station apparatus according to the seventh embodiment demodulates the received signal into the data signal after canceling the spread broadcasting signal, which would act as an interference signal (interference power) with respect to the spread data signal, the accuracy with which the data signal is demodulated, i.e., the reception quality of the data signal, is increased. Furthermore, inasmuch as the respread BCCH signal is generated by using the decoded broadcasting data, the respread BCCH signal is free from being influenced by noise signals and interference signals in the radio transmission path.

The CDMA mobile station apparatus according to the seventh embodiment compensates for a phase rotation of the spread broadcasting signal that is caused by the radio transmission path so as to generate the respread BCCH signal whose waveform is the same, or substantially the same, as the spread broadcasting signal that is included in the received signal. Consequently, the accuracy with which to cancel interference can be further increased.

The arrangement for canceling the entire spread broadcasting signal from the received signal is particularly effective when the CDMA mobile base station apparatus is used in a multipath environment. Such an application will be described below.

In the multipath environment, a direct wave and delayed waves arrive at the CDMA mobile base station apparatus with independent delay times and phases. Therefore, the code orthogonal relationship between the LC 141 and the spread data signal as shown in FIG. 19 is lost due to the delay, where the result is that the entire spread broadcasting signal may act as an interference signal with respect to the spread data signal.

Accordingly, in the multipath environment, by canceling the entire spread broadcasting signal from the received signal with the CDMA mobile base station apparatus according to the seventh embodiment, the characteristics of interference cancellation can be increased, and hence, the accuracy with which to demodulate the data signal can be thereby increased. For canceling interference with respect to a plurality of multipath signals, a plurality of BCCH demodulation units 103 and a plurality of BCCH respreading units 104, i.e., as many BCCH demodulation units 103 and BCCH respreading units 104 as the number of multipath signals, are provided, and the I- and Q-phase respread BCCH signals that are outputted from the BCCH respreading units 104 are linearly added and outputted to the subtractors 106, 107.

In the seventh embodiment, the spreading code for the entire spread broadcasting signal, e.g., the code that is composed of the spreading code of the LC and the spreading code of the long code mask symbol, corresponds to a control signal spreading code.

In the seventh embodiment, the BCCH demodulation unit 103 demodulates the received signal into the broadcasting signal by using the broadcasting signal spreading code, and the BCCH respreading unit 104 spreads the broadcasting signal with the broadcasting signal spreading code so as to generate the respread BCCH signal, thus providing a spread control signal generating means. Furthermore, in the seventh embodiment, the BCCH respreading unit 104 imparts a phase rotation to the generated respread BCCH signal, and thus, the BCCH respreading unit 104 is provided as a spread control signal generating means for generating a spread control signal whose phase rotation has been compensated for.

In the seventh embodiment, the subtractors 106, 107 subtract the respread BCCH signal from the received signal, and thus, the subtractors 106, 107 are provided as a subtracting means.

In the seventh embodiment, the DCH demodulation unit 108 demodulates the received signal from which the interference signal has been canceled into the data signal by using the data signal spreading code, and thus, the DCH demodulation unit 108 is provided as a data signal demodulating means. Demodulating the difference that is outputted from the subtracting means into the data signal may be equivalent to different demodulating modes as described above with respect to the first embodiment.

Eighth Embodiment

A CDMA mobile station apparatus according to an eighth embodiment of the present invention will be described below. Since the present invention is directed to an arrangement of a reception section of a CDMA mobile station apparatus, such an arrangement will primarily be described below.

Figure 17:
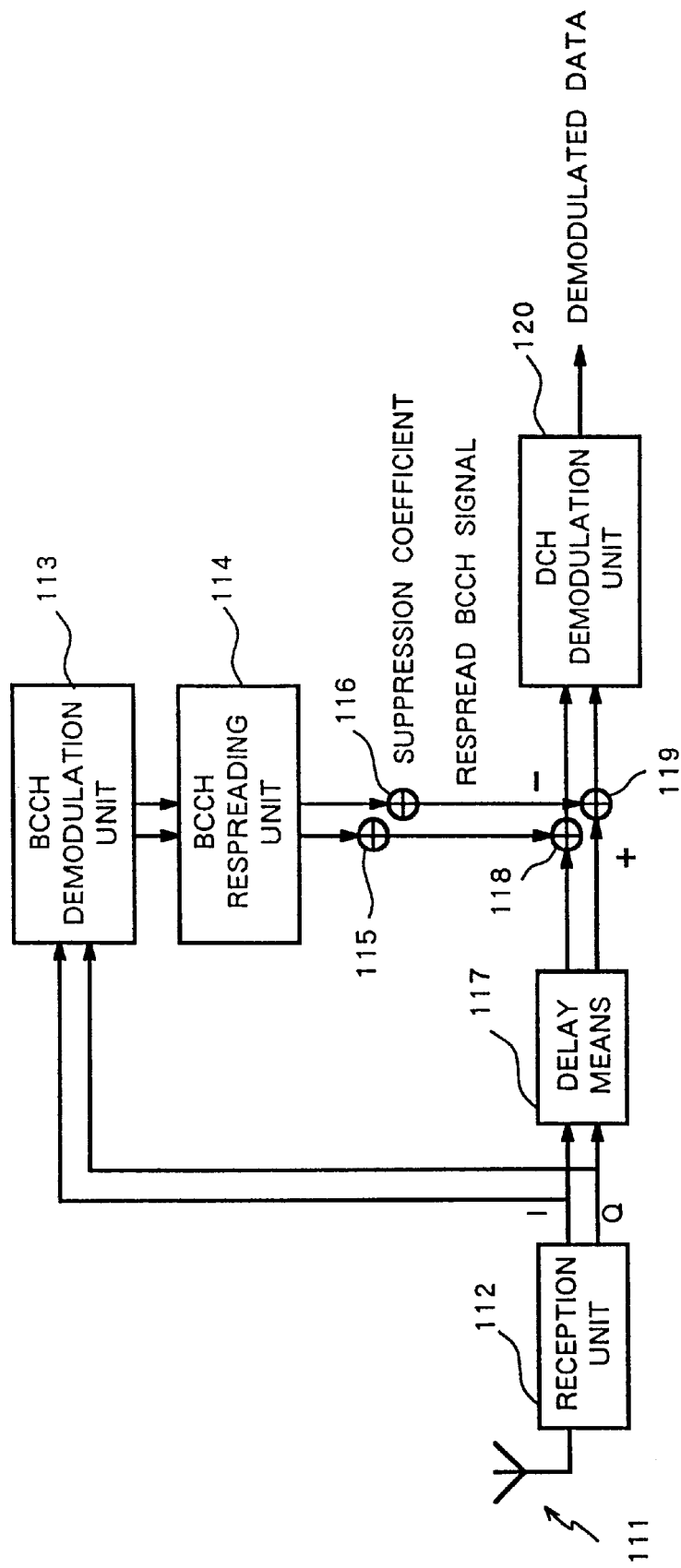
FIG. 17 is a block diagram of a CDMA mobile station apparatus according to an eighth embodiment of the present invention.

FIG. 17 shows a receiver in the CDMA mobile station apparatus according to the eighth embodiment of the present invention. As shown in FIG. 17, the receiver has an antenna 111, a reception unit 112, a BCCH demodulation unit 113, a BCCH respreading unit 114, a delay means 117, two subtractors 118, 119, and a DCH demodulation unit 120, which are the same as those of the receiver according to the seventh embodiment shown in FIG. 16. In addition, the receiver of the eighth embodiment shown in FIG. 17 has two multipliers 115, 116 for multiplying a suppression coefficient, and the two multipliers 115, 116 are connected between the BCCH respreading unit 114 and the subtractors 118, 119.

Details of the receiver of the eighth embodiment shown in FIG. 17 which are different from those of the receiver according to the seventh embodiment will primarily be described below.

The BCCH respreading unit 114 outputs generated I- and Q-phase respread BCCH signals to the multipliers 115, 116.

The multipliers 115, 116 multiply the I- and Q-phase respread BCCH codes that are outputted from the BCCH respreading unit 114 by a predetermined suppression coefficient, and the multipliers 115, 116 output the I- and Q-phase products to the subtractors 118, 119, respectively. In the eighth embodiment, the multiplier 115 corresponds to the I-phase, and the multiplier 116 corresponds to the Q-phase. The suppression coefficient is shared by the I-phase and the Q-phase, and the suppression coefficient has a value that is greater than 0 and equal to or smaller than 1, for example.

The subtractors 118, 119 subtract the respread BCCH signal that is multiplied by the suppression coefficient from the received signal.

The suppression coefficient is the same as the suppression coefficient described above with respect to the fifth embodiment. For example, even if the respread BCCH signal that is generated by the BCCH respreading unit 114 suffers an error with respect to the spread broadcasting signal that is included in the received signal due to an estimated transmission path error or the like, the suppression coefficient is effective in preventing the accuracy with which to demodulate the data signal from being lowered, i.e., in preventing noise from being intensified.

The CDMA mobile station apparatus according to the eighth embodiment employs the suppression coefficient so as to suppress or reduce the signal intensity of the respread BCCH signal, cancels the respread BCCH signal whose signal intensity has been suppressed as an interference signal from a received signal, and demodulates the received signal into a data signal. With the CDMA mobile station apparatus according to the eighth embodiment, even if an estimated transmission path error is produced, a respread BCCH signal which has an excessively large signal intensity is not subtracted from the received signal. Accordingly, the characteristics of interference cancellation are prevented from being deteriorated on the average. Therefore, the CDMA mobile station apparatus according to the eighth embodiment is capable of preventing the accuracy with which to demodulate the received signal into the data signal from being lowered even in a communication environment where there exists an estimated transmission path error.

The multipliers 115, 116 multiply the respread BCCH signal that is generated by the BCCH respreading unit 114 by the suppression coefficient, and thus, the multipliers are provided as a spread control signal generating means for generating a spread control signal whose signal intensity is suppressed.

Ninth Embodiment

A CDMA mobile station apparatus according to a ninth embodiment of the present invention will be described below. Since the present invention is directed to an arrangement of a reception section of a CDMA mobile station apparatus, such an arrangement will primarily be described below.

Figure 18:
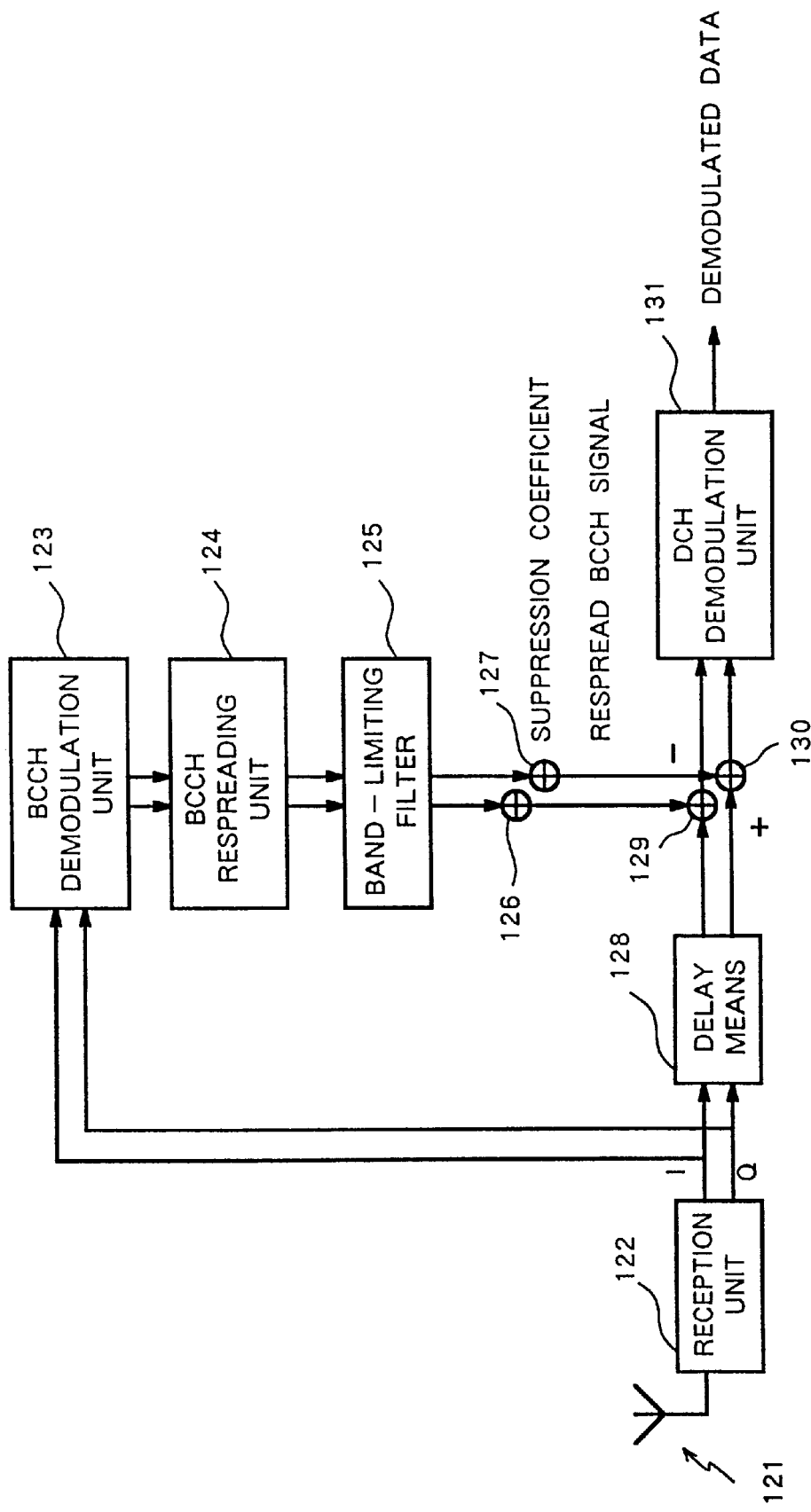
FIG. 18 is a block diagram of a CDMA mobile station apparatus according to a ninth embodiment of the present invention.

FIG. 18 shows a receiver in the CDMA mobile station apparatus according to the ninth embodiment of the present invention. As shown in FIG. 18, the receiver has an antenna 121, a reception unit 122, a BCCH demodulation unit 123, a BCCH respreading unit 124, two multipliers 126, 127 for multiplying a suppression coefficient, a delay means 128, two subtractors 129, 130, and a DCH demodulation unit 131, which are the same as those of the receiver according to the eighth embodiment shown in FIG. 17. In addition, the receiver of the ninth embodiment shown in FIG. 18 has a band-limiting filter 125 that is connected between the BCCH respreading unit 124 and the multipliers 126, 127.

Details of the receiver of the ninth embodiment shown in FIG. 18 which are different from those of the receiver according to the eighth embodiment will primarily be described below.

The BCCH respreading unit 124 outputs generated I- and Q-phase respread BCCH signals to the band-limiting filter 125.

The band-limiting filter 125 limits the bands of the I- and Q-phase respread BCCH signals that are outputted from the BCCH respreading unit 124, and the band-limiting filter 125 outputs the band-limited I- and Q-phase respread BCCH signals to the multipliers 126, 127.

The signal that is received by the CDMA mobile station apparatus via a radio link is band-limited by the base station apparatus which has transmitted the signal or the CDMA mobile station apparatus which has received the signal similar to the fourth embodiment. The band-limiting filter 125 limits the band of the signal in the same manner similar to the fourth embodiment. In the ninth embodiment, since both the I-phase respread BCCH signal and the Q-phase respread BCCH signal are limited in band, the band-limiting filter 125 comprises an FIR filter for the I-phase and an FIR filter for the Q-phase.

The multipliers 126, 127 multiply the I- and Q-phase respread BCCH signals that have been band-limited by the band-limiting filter 125 by the suppression coefficient.

The CDMA mobile station apparatus according to the ninth embodiment band-limits the respread BCCH signal, cancels the band-limited respread BCCH signal as an interference signal from a received signal, and demodulates the received signal into a data signal.

Accordingly, even if the spread broadcasting signal that is included in the received signal is band-limited, the CDMA mobile station apparatus according to the ninth embodiment band-limits the respread BCCH signal so as to compensate for the band limitation to thereby increase the accuracy of interference cancellation. As a result, the accuracy with which to demodulate the data signal is increased.

In the ninth embodiment, the band-limiting filter 125 band-limits the respread BCCH signal that is generated by the BCCH respreading unit 124, and thus, the band-limiting filter 125 is provided as a spread control signal generating means for generating a control signal which has been limited in band.

The CDMA base station apparatus, the base station apparatus for performing radio communications with the CDMA base station apparatus, the radio communication system that is provided in the CDMA base station apparatus, and the signals that are transmitted for radio communications are not limited to the details of the illustrated embodiments, but may be modified in various ways.

In the above-described embodiments, the present invention has been described with respect to the spread signal for DPDCH and the spread broadcasting signal for BCCH. However, the principles of the present invention are also applicable to other signals.

The various processing sequences that are carried out by the CDMA mobile base station according to the present invention may be controlled by a processor that runs a control program in a hardware resource which includes the processor, a memory, etc., or a functional means for performing the various processing sequences may be constructed as independent hardware circuits. The present invention may be realized as a computer-readable recording medium such as a floppy disk, a CD-ROM, etc. that stores the above-described control program. The processing sequences can be performed by reading the control program from the recording medium into a computer and executing the control program with the processor.

When the CDMA mobile station apparatus according to the present invention receives a spread control signal including a non-orthogonal spread signal that is generated by using a non-orthogonal spreading code that is non-orthogonal with a data signal spreading code and a spread data signal that is produced by spreading a data signal with a data signal spreading code transmitted from a base station apparatus via a radio link, the CDMA mobile station apparatus of the present invention generates a non-orthogonal spread signal by using a non-orthogonal spreading code, subtracts the generated non-orthogonal spread signal from a received signal so as to generate a difference signal, and demodulates the difference signal into a data signal by using the data signal spreading code. Therefore, the non-orthogonal spread signal that acts as an interference signal with respect to the spread data signal can be canceled from the received signal, and as a result, the accuracy with which to demodulate the data signal can be thereby increased.

When the CDMA mobile station apparatus according to the present invention receives a spread control signal that is produced by spreading a control signal with a control signal spreading code and a spread data signal that is produced by spreading a data signal with a data signal spreading code from a base station apparatus via a radio link, the CDMA mobile station apparatus of the present invention demodulates a received signal into a control signal by using a control signal spreading code, spreads the demodulated control signal with a control signal spreading code thereby to generate a spread control signal, subtracts the generated spread control signal from the received signal so as to generate a difference signal, and demodulates the difference signal into a data signal by using the data signal spreading code. Therefore, the entire spread control signal that acts as an interference signal with respect to the spread data signal can be canceled from the received signal, and as a result, the accuracy with which to demodulate the data signal can be thereby increased.

In the above-described arrangements, the CDMA mobile station apparatus of the present invention generates the non-orthogonal spread signal and the spread control signal which have been compensated for phase rotation. Therefore, even if these signals are subject to a phase rotation that is caused by a radio transmission path, the characteristics of interference cancellation can be increased, and hence, the accuracy with which to demodulate the data signal can be thereby increased.

Furthermore, in the above-described arrangements, the CDMA mobile station apparatus of the present invention generates the non-orthogonal spread signal and the spread control signal which have been limited in band. Therefore, even if these signals are limited in band by the base station apparatus or the CDMA mobile station apparatus, the characteristics of interference cancellation can be increased, and hence, the accuracy with which to demodulate the data signal can be thereby increased.

Moreover, in the above-described arrangements, the CDMA mobile station apparatus generates the non-orthogonal spread signal and the spread control signal whose signal intensities have been suppressed. Therefore, even if these signals suffer an estimated transmission path error, the characteristics of interference cancellation can be increased, and hence, the accuracy with which to demodulate the data signal can be thereby increased.

Although certain preferred embodiments of the present invention have been shown and described in detail, it should be understood that various changes and modifications may be made thereto without departing from the scope of the appended claims.

What is claimed is:

1. A CDMA mobile station apparatus for receiving a signal from a base station apparatus via a radio link, the received signal including a spread control signal, which includes a non-orthogonal spread signal that is generated by using a non-orthogonal spreading code which is non-orthogonal with a data signal spreading code, and a spread data signal that is produced by spreading a data signal with a data signal spreading code, said apparatus comprising:

non-orthogonal spread signal generating means for generating, without using the received signal, a non-orthogonal spread signal by using a non-orthogonal spreading code which corresponds to the non-orthogonal spreading code that is used to generate the non-orthogonal spread signal of the received signal;

substracting means for substracting the generated non-orthogonal spread signal from the received signal so as to generate a difference signal; and data signal demodulating means for demodulating the difference signal into a data signal by using the data signal spreading code.

2. A CDMA mobile station apparatus according to claim 1, wherein the non-orthogonal spread signal that included in the received signal is subjected to a phase rotation caused by a radio transmission path, and said non-orthogonal spread signal generating means comprises means for generating a non-orthogonal spread signal to which a phase rotation corresponding to the phase rotation cause by the radio transmission path is imparted.

3. A CDMA mobile station apparatus according to claim 1, wherein the non-orthogonal spread signal that is included in the received signal is limited in band, and said non-orthogonal spread signal generating means comprised means for generating a non-orthogonal spread signal which is limited in band.

4. A CDMA mobile station apparatus according to claim 2, wherein the non-orthogonal spread signal that is included in the received signal is limited in band, and said non-orthogonal spread signal generating means comprises means for generating a non-orthogonal spread signal which is limited in band.

5. A CDMA mobile station apparatus according to claim 1, wherein the non-orthogonal spread signal that is generated by said non-orthogonal spread signal generating means has an error with respect to the non-orthogonal spread signal that is included in the received signal, and said non-orthogonal spread signal generating means comprises means for generating a non-orthogonal spread signal whose signal intensity is suppressed.

6. A CDMA mobile station apparatus according to claim 2, wherein the non-orthogonal spread signal that is generated by said non-orthogonal spread signal generating means has an error with respect to the non-orthogonal spread signal that is included in the received signal, and said non-orthogonal spread signal generating means comprises means for generating a non-orthogonal spread signal whose signal intensity is suppressed.

7. A CDMA mobile station apparatus according to claim 3, wherein the non-orthogonal spread signal that is generated by said non-orthogonal spread signal generating means has an error with respect to the non-orthogonal spread signal that is included in the received signal, and said non-orthogonal spread signal generating means comprises means for generating a non-orthogonal spread signal whose signal intensity is suppressed.

8. A CDMA mobile station apparatus according to claim 4, wherein the non-orthogonal spread signal that is generated by said non-orthogonal spread signal generating means has an error with respect to the non-orthogonal spread signal that is included in the received signal, and said non-orthogonal spread signal generating means comprises means for generating a non-orthogonal spread signal whose signal intensity is suppressed.

9. A CDMA mobile station apparatus according to claim 1, wherein the spread control signal that is included in the received signal comprises a spread signal that is transmitted through a broadcasting channel, and the spread data signal that is included in the received signal comprises a spread signal that is transmitted through an individual data channel.

10. A CDMA mobile station apparatus for receiving a spread control signal that is produced by spreading a control signal with a control signal spreading code and a spread data signal that is produced by spreading a data signal with a data signal spreading code from a base station apparatus via a radio link, said apparatus comprising:
spread control signal generating means for demodulating a received signal into a control signal by using a control signal spreading code, and for spreading the demodulated control signal with a control signal spreading code so as to generate a spread control signal;
subtracting means for subtracting the generated spread control signal from the received signal so as to generate a difference signal; and
data demodulating means for demodulating the difference signal into a data signal by using the data signal spreading code;
wherein the spread control signal that is generated by said spread control signal generating means has an error with respect to the spread control signal that is included in the received signal, and said spread control signal generating means comprises means for generating a spread control signal whose signal intensity is suppressed.

11. A CDMA mobile station apparatus for receiving a spread control signal that is produced by spreading a control signal with a control signal spreading code and a spread data signal that is produced by spreading a data signal with a data signal spreading code from a base station apparatus via a radio link, said apparatus comprising;
spread control signal generating means for demodulating a received signal into a control signal by using a control signal spreading code, and for spreading the demodulated control signal with a control signal spreading code so as to generate a spread control signal;
subtracting means for subtracting the generated spread control signal from the received signal so as to generate a difference signal; and
data demodulating means for demodulating the difference signal into a data signal by using the data signal spreading code;
wherein the spread control signal that is included in the received signal is subjected to a phase rotation caused by a radio transmission path, and said spread control signal generating means comprises means for generating a spread control signal to which a phase rotation corresponding to the phase rotation caused by the radio transmission path is imparted; and
wherein the spread control signal that is generated by said spread control signal generating means has an error with respect to the spread control signal that is included in the received signal, and said spread control signal generating means comprises means for generating a spread control signal whose signal intensity is suppressed.

12. A CDMA mobile station apparatus for receiving a spread control signal that is produced by spreading a control signal with a control signal spreading code and a spread data signal that is produced by spreading a data signal with a data signal spreading code from a base station apparatus via a radio link, said apparatus comprising:
spread control signal generating means for demodulating a received signal into a control signal by using a control signal spreading code, and for spreading the demodulated control signal with a control signal spreading code so as to generate a spread control signal;
subtracting means for subtracting the generated spread control signal from the received signal so as to generate a difference signal; and
data demodulating means for demodulating the difference signal into a data signal by using the data signal spreading code;
wherein the spread control signal that is included in the received signal is limited in band, and said spread control signal generating means comprises means for generating a spread control signal which is limited in band; and
wherein the spread control signal that is generated by said spread control signal generating means has an error with respect to the spread control signal that is included in the received signal, and said spread control signal generating means comprises means for generating a spread control signal whose signal intensity is suppressed.

13. A CDMA mobile station apparatus for receiving a spread control signal that is produced by spreading a control signal with a control signal spreading code and a spread data signal that is produced by spreading a data signal with a data signal spreading code from a base station apparatus via a radio link, said apparatus comprising:

spread control signal generating means for demodulating a received signal into a control signal by using a control signal spreading code, and for spreading the demodulated control signal with a control signal spreading code so as to generate a spread control signal;

subtracting means for subtracting the generated spread control signal from the received signal so as to generate a difference signal; and data demodulating means for demodulating the difference signal into a data signal by using the data signal spreading code;

wherein the spread control signal that is included in the received signal is subjected to phase a rotation caused by a radio transmission path, and said spread control signal generating means comprises means for generating a spread control signal to which a phase rotation corresponding to the phase rotation caused by the radio transmission path is imparted;

wherein the spread control signal that is included in the received signal is limited in band, and said spread control signal generating means comprises means for generating a spread control signal which is limited in band; and wherein the spread control signal that is generated by said spread control signal generating means has an error with respect to the spread control signal that is included in the received signal, and said spread control signal generating means comprises means for generating a spread control signal whose signal intensity is suppressed.

* * * * *